(12) United States Patent
Ueda et al.

(10) Patent No.: US 6,305,346 B1
(45) Date of Patent: *Oct. 23, 2001

(54) FUEL INJECTION INTERNAL COMBUSTION ENGINE WITH SUB-COMBUSTION CHAMBER

(75) Inventors: Minoru Ueda; Yuji Tsushima; Hiroshi Yamashita; Yoshihiro Takada; Yutaka Nishikawa, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/607,339

(22) Filed: Jun. 30, 2000

Related U.S. Application Data

(62) Division of application No. 09/082,115, filed on May 20, 1998, now Pat. No. 6,095,111.

(30) Foreign Application Priority Data

May 23, 1997 (JP) .................................................... 9-134165
May 24, 1997 (JP) .................................................... 9-150380

(51) Int. Cl.⁷ .................................................... F02B 19/10
(52) U.S. Cl. ............................................................ 123/259
(58) Field of Search ................................ 123/257, 259, 123/286, 275

(56) References Cited

U.S. PATENT DOCUMENTS

| | | | |
|---|---|---|---|
| 4,009,692 | * 3/1977 | Sakai et al. | 123/259 |
| 4,077,368 | * 3/1978 | Abthoff et al. | 123/259 |
| 4,224,902 | * 9/1980 | Binder et al. | 123/286 |
| 4,619,229 | * 10/1986 | Imoto et al. | 123/286 |
| 5,020,504 | 6/1991 | Morikawa . | |
| 5,024,193 | * 6/1991 | Graze, Jr. | 123/259 |
| 5,025,765 | 6/1991 | Kawamura . | |
| 5,040,504 | 8/1991 | Matsuoka . | |
| 5,054,443 | 10/1991 | Kawamura . | |
| 5,065,714 | 11/1991 | Matsuoka . | |
| 5,095,872 | 3/1992 | Kawamura . | |
| 5,333,582 | 8/1994 | Kawamura . | |
| 5,520,148 | 5/1996 | Kawamura et al. . | |
| 5,628,288 | 5/1997 | Masuda . | |
| 5,769,050 | * 6/1998 | Ito et al. | 123/259 |
| 5,950,592 | * 9/1999 | Takada et al. | 123/257 |
| 6,055,954 | * 5/2000 | Takada et al. | 123/257 |

FOREIGN PATENT DOCUMENTS

| | | |
|---|---|---|
| 0747583A1 | 12/1996 | (EP) . |
| A5195787 | 8/1993 | (JP) . |

* cited by examiner

*Primary Examiner*—John Kwon
(74) *Attorney, Agent, or Firm*—Birch, Stewart, Kolasch & Birch, LLP

(57) ABSTRACT

A spark-ignition fuel injection internal combustion engine is provided with a sub-combustion chamber in communication with a main combustion chamber. An injecting device intermittently injects mixture gas into the sub-combustion chamber. A volumetric ratio of each of the sub-combustion chamber and the main combustion chamber is set within a range of 1:4 to 3:2.

17 Claims, 18 Drawing Sheets

FUEL INJECTION INTERNAL COMBUSTION ENGINE WITH SUB-COMBUSTION CHAMBER

This application is a continuation divisional of co-pending Application Ser. No. 09/082,115, filed on May 20, 1998, now Pat. No 6,095,111 the entire contents of which are hereby incorporated by reference.

BACKGROUND OF THE INVENTION

1. Field of the Invention

The present invention relates to a fuel injection internal combustion engine. More particularly, this invention relates to a spark ignition internal combustion engine having a sub-combustion chamber in which mixture gas with an air-fuel ratio adapted for an engine operating state over a wide operating range of the engine is supplied to a combustion chamber. The amount of hydrogen carbide discharged is lowered, and the engine has a high efficiency.

2. Description of the Background Art

A fuel injection internal combustion engine is known in which a sub-combustion chamber is provided in communication with a main-combustion chamber, and a mixture of the fuel and compressed air is injected to this sub-combustion chamber. For example, the Official Gazette of Japanese Patent Application Laid-open No. HEI 5-195787 describes such a fuel injection type two-cycle engine.

In the engine, according to FIG. 1 of the Official Gazette above, an air fuel injecting valve for injecting the mixture of the compressed air and fuel, and a spark plug, are fitted to the sub-combustion chamber. The air fuel injecting valve is provided with a solenoid type fuel switching valve and a solenoid type mixture switching valve.

In general, in such a fuel injection two-cycle engine, on the occasion of injecting the mist of fuel from the mixture switching valve, such spraying work is assisted by the pressure of the compressed air. Therefore, the fuel of comparatively high concentration is converted to fine particles to form the adequate spraying form (spraying condition of the fuel).

However, in order to constitute a desirable spray form, the compressed air must be maintained at a high pressure, for example, 5 kg/cm$^2$ G or higher. More particularly, the pressure must further be increased in the case of supplying a large amount of fuel. In other words, since it is necessary to maintain the desirable spray form of the fuel, it is not easy to increase the amount of fuel to be supplied in the case of assisting the spraying effect of the fuel with low pressure compressed air. Moreover, a high pressure air pump and a high pressure fuel pump are necessary to assist the spray form of the fuel with the low pressure compressed air.

A spark ignition two-stroke cycle internal combustion engine is known which is provided with a sub-combustion chamber communicated with the main combustion chamber in order to make a positive ignition of a small amount of fuel under a low load operating state, and the mixture gas is formed in the sub-combustion chamber in a layer shape from rich mixture gas to lean mixture gas (refer to a gazette of Japanese Patent Publication No. Hei 5-195787).

In the case of the two-cycle internal combustion engine described in the aforesaid gazette, it had a disadvantage that a volume of the sub-combustion chamber was remarkably low as compared with a volume of the main combustion chamber, so that under a low load operating state, it was possible to form a small amount of fuel in the sub-combustion chamber in a stratified shape in a desired distribution of air-fuel ratio, although under a high load operating state, a large amount of fuel could not be supplied in the sub-combustion chamber in such a way that a proper air-fuel ratio might be attained. Therefore, irregular combustion was produced and a large amount of hydrogen carbide was discharged.

SUMMARY OF THE INVENTION

It is therefore an object of the present invention to provide the technology to enhance the combustion efficiency even when the fuel is injected with low pressure compressed air into the sub-combustion chamber from a mixture switching valve.

In order to attain the object explained above, the invention proposes a fuel injection internal combustion engine providing a sub-combustion chamber in communication with a main-combustion chamber of the internal combustion engine, and fitting a mixture switching valve to inject the mixture of the fuel and compressed air into the sub-combustion chamber. The sub-combustion chamber is formed of a material having a thermal conductivity which is lower than that of the material forming the main-combustion chamber.

Since the sub-combustion chamber is structured by a material having low thermal conductivity, the amount of heat released to the external side through the wall of the sub-combustion chamber is reduced, and thereby the inside of the sub-combustion chamber is maintained at a high temperature. Therefore, the sub-combustion chamber maintains the condition heated by the combustion gas. Since the mixture is supplied to the high temperature sub-combustion chamber, the fuel in the mixture is easily vaporized. Therefore, since the fuel is quickly vaporized even when a large amount of fuel is sprayed into the sub-combustion chamber with low pressure compressed air, and the particles of fuel are large in size, good combustion can be realized even with a non-optimum spray form, and high combustion efficiency can be attained. Moreover, since ignition is possible even when particle size of the fuel is comparatively large, lift of the valve body of the mixture switching valve can be set to a comparatively large amount.

Moreover, since it is not required to improve the quality of the spray form in order to spray the large amount of mixture into the sub-combustion from the mixture switching valve, it is not necessary to greatly enhance the accuracy of the mixture switching valve without relation to the lift amount of the valve body. Therefore, the cost of the mixture switching valve and valve control system can be lowered.

Since the spray form of the fuel can be supported by the low pressure compressed air, a low pressure air pump and a low pressure fuel pump can be used. In the case of extracting the power of the air pump and fuel pump from the internal combustion engine, since each pump is operating at low pressure, only a low power is extracted and a large load is not applied to the internal combustion engine.

The main combustion chamber is constructed of aluminum alloy, and the sub-combustion chamber is constructed of cast iron.

Since the sub-combustion chamber is constructed of cast iron having low thermal conductivity, a small amount of heat is released to the external side through the wall of the sub-combustion chamber and as a result, the inside of the sub-combustion chamber is maintained at a high temperature. Moreover, since the main combustion chamber is constructed of an aluminum alloy, the internal combustion engine is lightweight. Therefore, although the internal combustion engine is lightweight, since the fuel is quickly vaporized if a large amount of fuel is sprayed to the sub-combustion chamber with low pressure compressed air, good combustion condition can be realized with higher combustion efficiency with the spray form even if it is not in the optimal form.

The present invention further relates to an improvement of the spark ignition internal combustion engine which is comprised of a sub-combustion chamber communicated with a main combustion chamber, an injecting means for directly and intermittently injecting mixture gas into the sub-combustion chamber, and an igniting means arranged in the sub-combustion chamber. Each of ratios of volumes of the sub-combustion chamber and the main combustion chamber is set within a range of 1:4 to 3:2.

The present invention is constructed as described above in which a volume of the sub-combustion chamber is not set to such a higher ratio as compared with a volume of the main combustion chamber, so that under a low load operating state in which a small amount of fuel is supplied to the combustion chambers, the mixture gas with a proper distribution of air-fuel ratio is formed in the sub-combustion chamber in a stratified shape. Ignition is positively performed, irregular combustion is avoided and a discharging amount of hydrogen carbide is restricted.

Under a high load operation state in which a large amount of fuel is supplied to the combustion chambers, such rich mixture gas as one not producing any irregular combustion is formed in the sub-combustion chamber so as to perform a uniform combustion. A purifying performance for exhaust gas is kept at a high level and, at the same time, a high output may easily be attained.

The invention makes it possible to perform an easy injection of mixture gas with a proper air-fuel ratio into the sub-combustion chamber by the mixture gas injecting means overcoming a pressure in the sub-combustion chamber during a mixture gas injecting period.

Further, the mixture gas in the sub-combustion chamber is not agitated with gas flowing from within the main combustion chamber, but a stratified flow state of the gas can be kept. Irregular combustion is avoided, and under a high load operating range, it is sufficiently mixed with scavenging flow entered from within the main combustion chamber into the sub-combustion chamber to enable mixture gas having a substantially uniform air-fuel ratio to be attained. The result is that a uniform combustion state is obtained, complete combustion is carried out, a high exhaust gas purifying performance is attained, and efficiency and an output are kept at a high level.

Further, the mixture gas injected into the sub-combustion chamber and supplied to the main combustion chamber is applied with a directional characteristic so as to enable a blowing-off of the mixture gas to be prevented in advance from the exhaust port or exhaust valve. At the same time, the eccentric structure can be formed and further the mixture gas injected from the injecting means and flowed from within the sub-combustion chamber to the main combustion chamber is fed to a place near the igniting means so as to enable stable combustion to be carried out.

Still further, the invention is applied to the two-cycle internal combustion engine in which a blowing-off of the gas is easily carried out to enable a discharging amount of hydrogen carbide in the exhaust gas to be reduced and at the same time its output as well as efficiency can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

The invention will be described with reference to an embodiment shown in the accompanying drawings.

Figure 1:
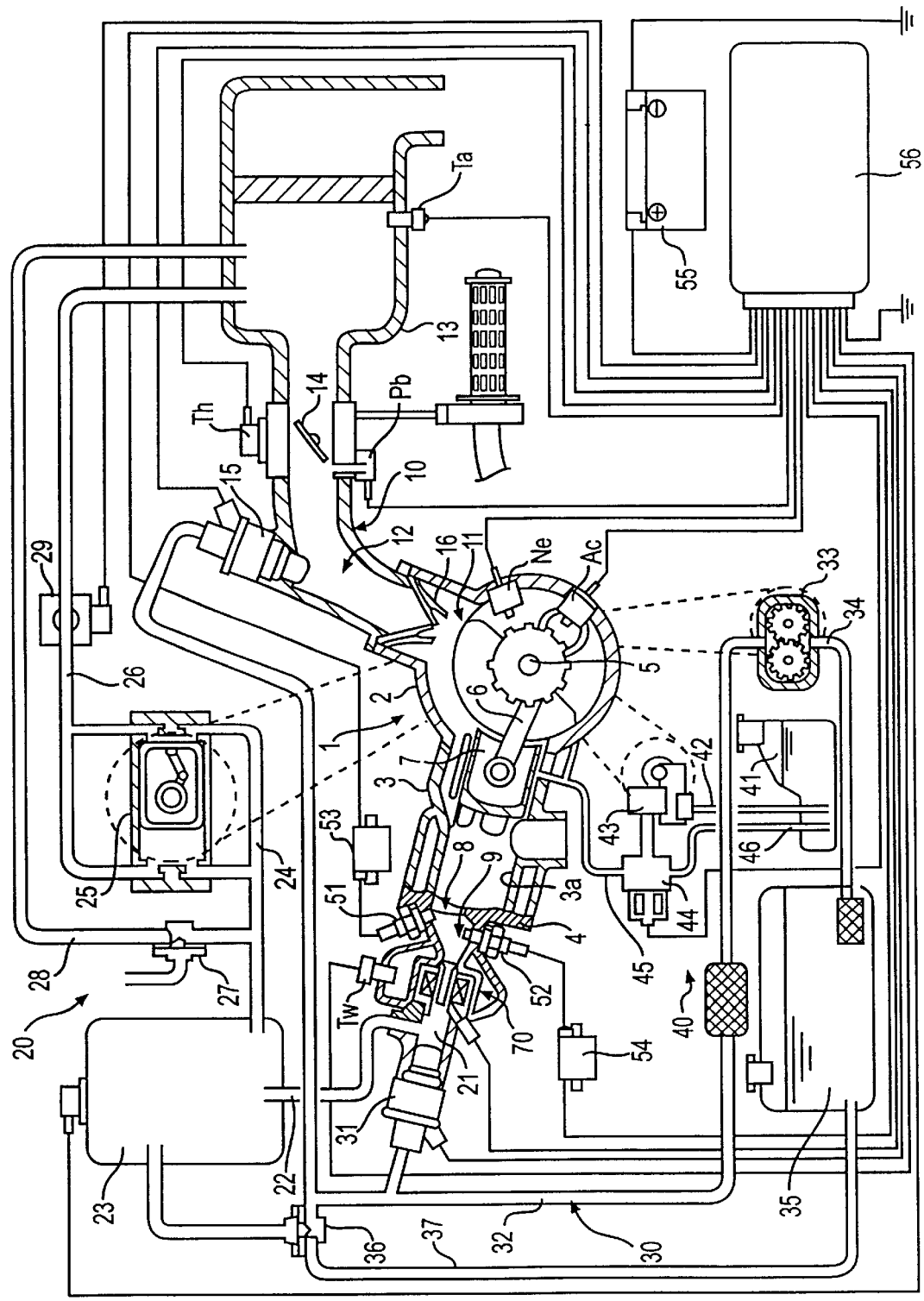
FIG. 1 is a schematic view of an internal combustion engine with a sub-combustion chamber of the present invention.

FIG. 1 shows a fuel injected two-cycle internal combustion engine 1 which includes an auxiliary combustion chamber 9. The two-cycle engine may be installed on a scooter type motorcycle or the like (not shown). The engine 1 mainly includes a crankcase 2, a cylinder block 3, a cylinder head 4, a crankshaft 5, a connecting rod 6, and a piston 7.

The engine 1 further includes a main combustion chamber 8 communicating with the auxiliary combustion chamber 9 to which an air-fuel mixture valve 70 is attached. A main fuel injection valve (main injector) 31 is provided in an accumulator 21 above the air-fuel mixture valve 70. An air supply system 10 is provided for the auxiliary combustion chamber 9. The engine 1 further includes a compressed air supply system 20, a fuel supply system 30, and a lubrication oil supply system 40.

The air supply system 10 for the auxiliary combustion chamber includes an air cleaner 13 communicating with a crank chamber 11 in the crankcase 2 via an air charging passage 12, a throttle valve 14 positioned between upstream and downstream parts of the air charging passage 12, an auxiliary fuel injection valve (auxiliary injector) 15, and a reed valve 16. All of these members are arranged in the foregoing order. As the piston 7 moves upward to evacuate the crank chamber 11, air is introduced into the air charging passage 12 via the air cleaner 13 and is further introduced into the crank chamber 11 via the reed valve 16.

The auxiliary fuel injection valve 15 injects the fuel when the internal combustion engine 1 is started or when lubrication oil is necessary.

The compressed air supply system 20 includes a surge tank 23 communicating with the accumulator 21 via an air pipe 22. The surge tank 23 is connected to the air cleaner 13 via an air discharge pipe 24, an air pump 25 and an air intake pipe 26. Following the rotation of the crankshaft 5, the air pump 25 is activated to compress air in the air cleaner 13 so that the compressed air is supplied to the surge tank 23 and is then transferred to the accumulator 21. An air pressure regulating valve 27 is supplied for maintaining the compressed air at a predetermined pressure in the surge tank 23 and the air discharge pipe 24. An air returning pipe 28 and a stop valve 29 are also provided.

The fuel supply system 30 includes a fuel tank 35 which is connected to the main and auxiliary fuel injection valves 31 and 15 via a fuel injection pipe 32, a fuel pump 33 and a fuel intake pipe 34. As the crankshaft 5 rotates, the fuel pump 33 is activated to supply the fuel from the fuel tank 35 to the main and auxiliary fuel injection valves 31 and 15. A fuel pressure regulating valve 36 is provided for maintaining the fuel within the fuel injection pipe 32 at a predetermined pressure, and a fuel returning pipe 37 is also provided.

The lubrication oil supply system 40 supplies lubrication oil to sliding parts of the engine 1. The lubrication oil supply system 40 includes a lubrication oil tank 41, a lubrication oil pipe 42, a lubrication oil pump 43, a lubrication oil control valve 44 and a lubrications oil supply pipe 45. Following the rotation of the crankshaft 5, the lubrication oil pump 43 is activated to provide the sliding parts of the engine 1 with an amount of lubrication oil determined by the lubrication oil control valve 44. A lubrication oil return pipe 46 is provided for returning lubrication oil to the tank 41.

An electronic control apparatus 56 is additionally provided to the two-cycle internal combustion engine 1. The electronic control apparatus 56 uses a battery 55 as the power supply. The electronic control apparatus 56 receives input signals from a sensor Ne to detect the number of rotations of crankshaft 5, a crank angle sensor Ac to detect the crank angle, a throttle opening sensor Th to detect an opening of a throttle, a temperature sensor TA to detect the ambient air temperature, a pressure sensor PB to detect the inlet pressure downstream of the throttle valve 14, and a temperature sensor Tw to detect the temperature of cooling water of the engine.

The engine is also provided with a main spark plug 51 for the main combustion chamber 8 and an auxiliary spark plug 52 for the auxiliary combustion chamber 9. The spark plugs 51, 52 are respectively provided with ignition coils 53, 54. An output terminal of the electronic control apparatus 56 is respectively connected to the fuel injecting valves 15, 31, the ignition coils 53, 54 and the lubricant control valve 44.

Figure 2:
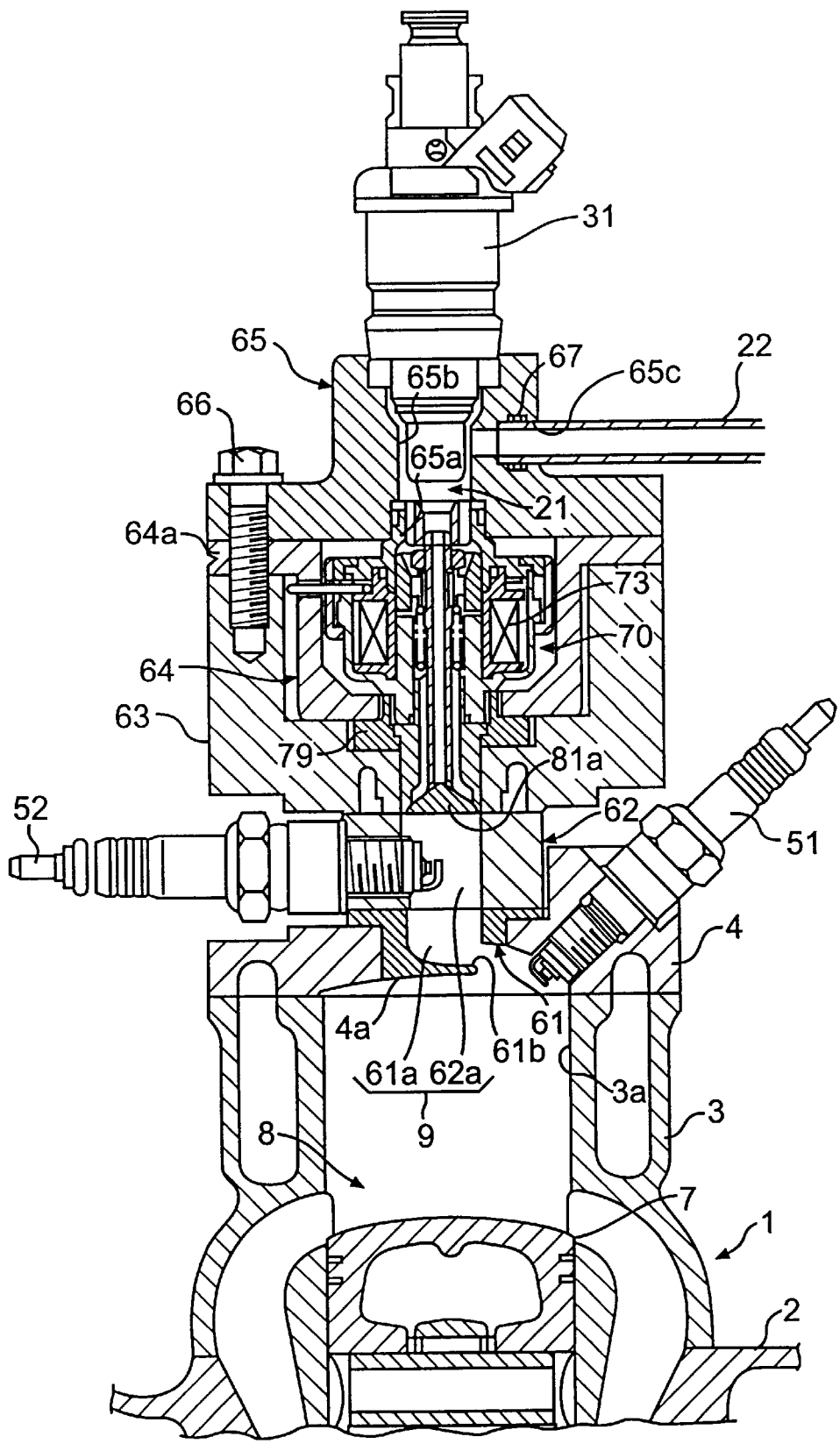
FIG. 2 is a cross-sectional view of the essential portion around the main combustion chamber and the sub-combustion chamber of the internal combustion engine of the present invention.

FIG. 2 is a cross sectional view of the main part of the engine around the main and auxiliary combustion chambers to which the present invention is applied. To simplify the description, the engine 1 is depicted to be arranged in the direction of FIG. 2 (i.e. the upper part of FIG. 2 corresponds to the upper part of the engine 1).

In the engine 1, the main combustion chamber 8 is present at an upper part of a cylinder 3a of the cylinder block 3 at a position opposite to an exhaust port (not shown). The auxiliary combustion chamber 9 is positioned in the cylinder head 4 to communicate with the main combustion chamber 8. The air-fuel mixture valve 70 and the auxiliary spark plug 52 are attached to an end of the auxiliary combustion chamber 9 in order to inject the air-fuel mixture. The main fuel injecting valve 31 is disposed in the accumulator 21 above the air-fuel mixture valve 70. The main spark plug 51 for the main combustion chamber 8 is attached to the cylinder head 4.

The cylinder head 4 has a through-hole 4a formed at the center of the cylinder 3a. A lower casing 61 is fitted in the through-hole 4b. An upper casing 62 is placed on the lower casing 61 and is fixed to the cylinder head 4 together with the lower casing 61.

The lower casing 61 defines a space 61a and includes a communicating part 61b which is formed by cutting a part of a wall of the lower casing 61 and which communicates with the main combustion chamber 8. The upper casing 62 defines a space 62a and has the auxiliary spark plug 52 attached therewith. The spaces 61a and 62a communicate with each other to constitute the auxiliary combustion chamber 9.

The lower and upper cases 61, 62 forming the sub-combustion chamber 9 are formed of a material having a thermal conductivity which is lower than that of the material of the cylinder block 3 and the cylinder head 4 forming the main combustion chamber 8. For example, the main combustion chamber 8 (cylinder block 3 and cylinder head 4) is formed of an aluminum alloy, while the sub-combustion chamber 9 (lower end upper cases 61, 62) is formed of cast iron, ductile cast iron or cast steel, etc.

In order to attach the air-fuel mixture valve 70 to the upper part of the auxiliary combustion chamber 9, a box-shaped stand 63 having an open top is attached to an upper end of the upper casing 62. A valve box 64 having an open top is inserted into the stand 63. A flange 64a of the valve box 64 is placed on the stand 63, and a cover 65 is placed on the valve box 64 in order to close the open top of the valve box 64. The stand 63, flange 64a and cover 65 are fastened using a bolt 66, thereby housing the air-fuel mixture valve 70 in the valve box 64.

The air-fuel mixture valve 70 has its bottom extending through the bottoms of the stand 63 and the valve box 64 such that a valve body 81 a faces the auxiliary combustion chamber 9 (the upper end of the space 62a of the upper casing 62). The air-fuel mixture valve 70 is attached with its lower flange 79 sandwiched between an inner bottom of the stand 63 and a rear surface of the valve box 64, and with its upper end fitted into a stepped opening 65a on a rear surface of the cover 65.

The cover 65 has a through-hole 65b at the upper end of the stepped opening 65a to constitute the accumulator 21. The accumulator 21 is formed with a pipe attaching opening 65c on one side thereof. The main fuel injection valve 31 is attached to the upper end of the accumulator 21, while an air intake pipe 22 is attached in the pipe attaching opening 65c, with an O-ring 67 located between the air intake pipe 22 and the pipe attaching opening 65c.

Figure 3:
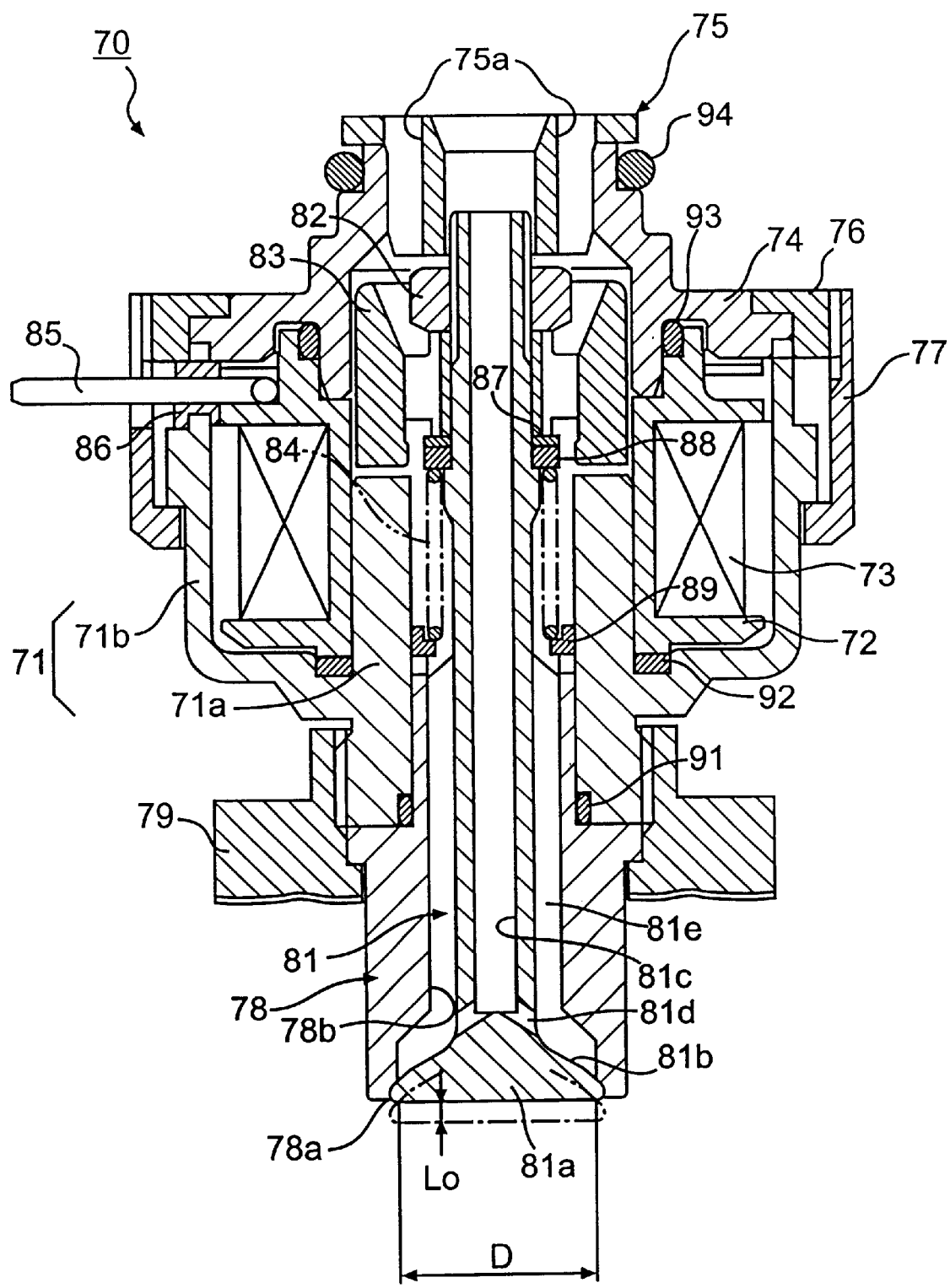
FIG. 3 is a cross-sectional view of the mixture switching valve of the present invention.

FIG. 3 is a cross-sectional view of the air-fuel mixture valve according to the invention.

The air-fuel mixture valve 70 is a solenoid poppet valve, and is opened when a core 83 is moved by the magnetic force of the electromagnetic coil 73 in order to axially shift the valve stem 81 via the core 83.

The air-fuel mixture valve 70 includes a housing 71 with inner and outer cylinders 71a and 71b. A coil bobbin 72 is fitted between the inner and outer cylinders 71a and 72b of the housing 71. The electromagnetic coil 73 is wound around the coil bobbin 72. A disc-shaped lid 74 having an opening therein is attached to the upper part of the housing 71 to cover the coil bobbin 72 and the electromagnetic coil 73. A cylindrical cap 75 with a flange is engaged with the upper end of a projecting part of the lid 74. The cap 75 has a plurality of gas holes 75a formed along a periphery thereof. An annular adapter bolt 76 and a stepped nut 77 sandwich and threadably secure the housing 71 and the lid 74 from upper and lower sides thereof A stepped cylindrical valve seat 78 is fitted in the inner cylinder 71a to be in contact with the bottom of the inner cylinder 71a. A lower flange 79 is threadably attached into the inner cylinder 71a to bring the valve seat 78 into pressure contact with the bottom of the inner cylinder 71a. The valve stem (valve rod) 81 with the valve body 81a is fitted in the inner cylinder 71a and the valve seat 78 in order to be axially movable. The core 83 is engaged with the top of the valve stem 81 and fastened by a nut 82. A spring 84 urges the valve stem 81 and the core 83 in the direction for the valve body 81a to open the air-fuel mixture valve 70.

The valve seat 78 has a tapered valve seat face 78a. The valve stem 81 is integrally former with the valve body 81a, which has a tapered upper surface 81b. The tapered surface 81b functions as a valve face, and comes into and out of contact with the valve seat face 78a in order to open and close the air-fuel mixture valve 70. With this air-fuel mixture valve 70, the valve seat 78 has a diameter of 6 to 10 mm, and a lift (open/close stroke) $L_o$ of the valve body 81a is 0.3 to 0.6 mm, thereby increasing an open area of the air-fuel mixture valve 70.

The core 83 is axially movable in an opening of the coil bobbin 72 projecting upward from the inner cylinder 71a, and an opening on the lid 74. The spring 84 is a return spring such as a compression spring or the like.

As shown in FIG. 3, the air-fuel mixture valve 70 further includes an electromagnetic coil terminal 85, a terminal grommet 86, a washer 88, a spring receptacle 89 mounted atop the valve seat 78, and O-rings 91 to 94.

Figure 4:
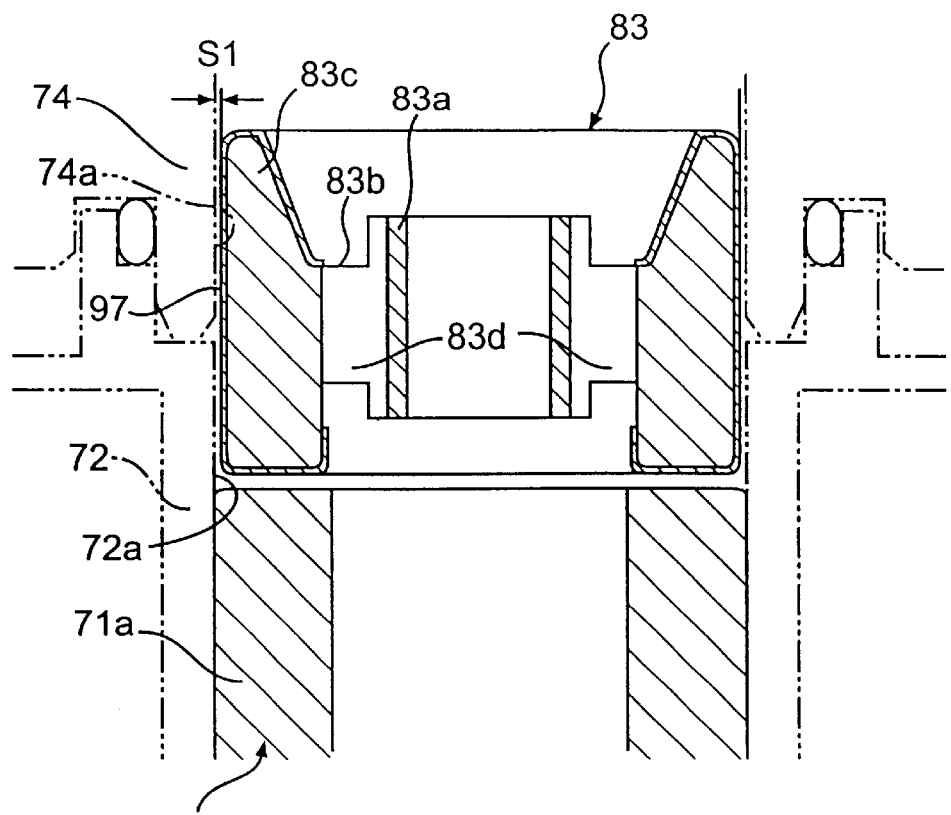
FIG. 4 is a cross-sectional view of the core of the mixture switching valve of the present invention.

FIG. 4 is a cross sectional view of the core according to the invention. The core 83 includes a boss 83a attached to the valve stem 81 (refer to FIG. 3), a rim 83b, and a core part 83c, and is made of a magnetic material such as electromagnetic soft iron or the like. The foregoing members are formed as one component.

The core 83c has its surface (at least the outer surface) covered with a film 97 having a low frictional resistance. Specifically, the film 97 is made of fluorine group resin such as tetrafluoroethylene (trade name: TEFLON). A clearance $S_1$ between the core 83c covered with the film 97, the opening 72a of the coil bobbin 72, and the opening 74a of the lid 74 is approximately 150 μm, so that the core 83 can axially and smoothly slide in the openings 72a and 74a.

Figure 5:
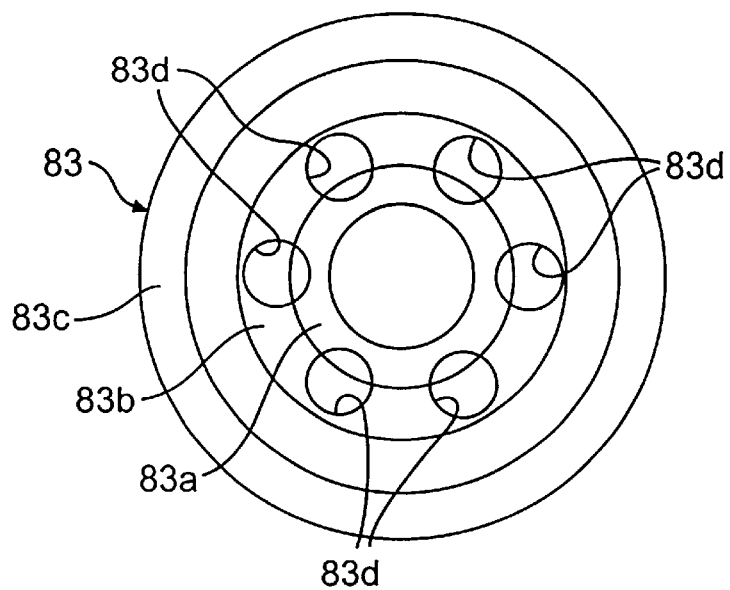
FIG. 5 is a plan view of the core of the mixture switching valve of the present invention.

FIG. 5 is a top plan view of the core 83, showing a plurality of gas openings 83d extending through the rib 83b of the core 83.

Figure 6:
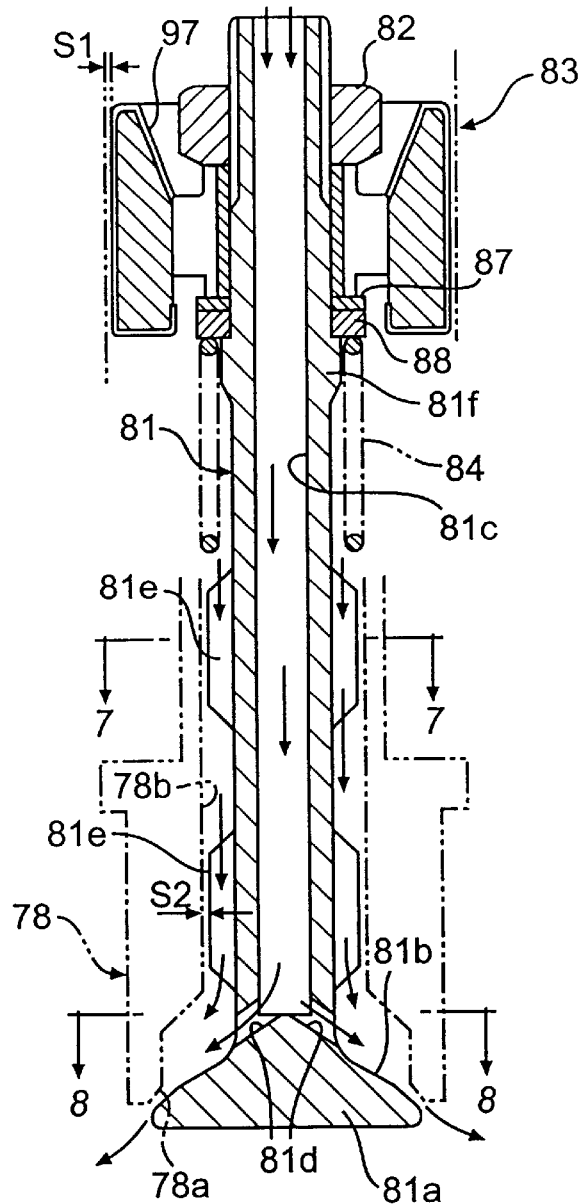
FIG. 6 is a cross-sectional view of the valve shaft of the mixture switching valve of the present invention.

FIG. 6 is a cross-sectional view of the valve stem according to the invention. The valve stem 81 is substantially tubular, and has a gas opening 81c extending near the upper end of the valve body 81c, and a plurality of discharge openings 81d (see FIG. 8) which extend from the bottom of the gas opening 81c substantially along the upper surface 81b of the valve body 81a.

The valve stem 81 is provided with upper and lower guides 81e guided in the opening 78b of the elongate tubular valve seat 78, and a step 81f determining an axial position of the core 83. A clearance $S_2$ between the opening 78a of the valve seat 78 and the guides 81e is approximately 15 μm. The clearances $S_1$ and $S_2$ enable the valve stem 81 to move smoothly in the axial direction without twisting.

Figure 7:
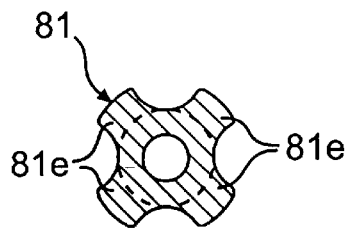
FIG. 7 is a cross-sectional view along line 7—7 of FIG. 6.

FIG. 7 is a cross-sectional view of the valve stem, taken along line 7—7 in FIG. 6. Four guides 81e are formed along the periphery of the valve stem 81.

Figures 8, 9:
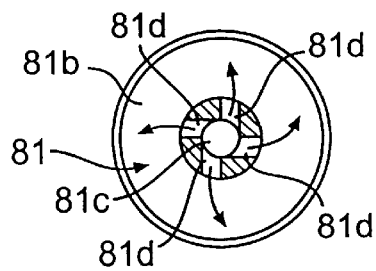
FIG. 8 is a cross-sectional view along line 8—8 of FIG. 6.
FIG. 9 is an operation diagram of the mixture switching valve of the present invention.

FIG. 8 is a cross sectional view of the valve stem 81, taken along line 8—8 in FIG. 6. The gas opening 81c is formed at the center of the valve stem 81, and the four discharge openings 81d are formed at positions offset from the center of the valve stem 81. The discharge openings 81d extend substantially on the upper surface 81b of the valve body 8a, and are present at positions offset from the center of the valve stem 81, so that the air-fuel mixture is injected in a spiral stream into the auxiliary combustion chamber 9 (shown in FIG. 2). Therefore, the air-fuel mixture in the spiral stream can blow off deposits (burnt waste containing carbon and cinders) which stick onto the valve seat 78a, and the upper surface 81b of the valve body 81 when the air-fuel mixture is burnt.

The valve body 81a itself is rotated by the spiral stream of air-fuel mixture 70, thereby removing deposits sticking thereto. As a result, it is easily possible to remove the deposits sticking to the air-fuel mixture valve regardless of a combustion state in the auxiliary combustion chamber 9. Further, since the air-fuel mixture is blown spirally out of the discharge openings 81d, a mixing of the fuel and the compressed air is promoted, and combustion efficiency is improved.

The operation of the air-fuel mixture valve 70 will be described with reference to FIG. 9.

With the air-fuel mixture valve 70 closed, the fuel G is injected into the accumulator 21 via the main fuel injection valve 31. Compressed air A is supplied to the accumulator 21 via the air pipe 22. The pressure of the compressed air is set, for example, to about 1 to 3 $kg/cm^2 G$. In this state, electric power is supplied to the terminal 85 in order to energize the electromagnetic coil 73, which makes the core 83 descend due to the magnetic force. As a result, the core 83 and the valve stem 81 are moved downward together, so that the valve body 81a moves away from the valve seat face 78a to open the air-fuel mixture valve 70. Thereafter, the air-fuel mixture M containing the fuel G and the compressed air A in the accumulator 21 is injected into the auxiliary combustion chamber 9 (FIG. 2) via the gas opening 81c and discharge openings 81d of the valve stem 81 and via the gas openings 75a on the cap 75, gas openings 83d of the core 83, the clearance around the valve stem 81.

The reason why the sub-combustion chamber 9 is formed of a material having a thermal conductivity which is lower than that of the material forming the main-combustion chamber 8 will be explained with reference to FIG. 2 When an aluminum alloy is used as the material of the cylinder block 3 and cylinder head 4 forming the main combustion chamber 8, and cast iron is used as the material of the upper and lower cases 61, 62 forming the sub-combustion chamber 9, the thermal conductivity (A) of the aluminum alloy is about 175 kcal/m*h°C., and thermal conductivity of the cast iron is about 45 kcal/m*h°C.

Because the sub-combustion chamber 9 is formed of cast iron having a low thermal conductivity, the amount of heat released to the external side through the wall of the sub-combustion chamber 9 is reduced, As a result, the inside of the sub-combustion chamber 9 is kept at a high temperature. Therefore, the sub-combustion chamber 9 maintains the condition heated by the combustion gas. Since the mixture is supplied to the sub-combustion chamber 9 at a high temperature, the fuel in the mixture is easily vaporized in the sub-combustion chambers. Therefore, since the fuel is easily vaporized even when a large amount of fuel is injected to the sub-combustion chambers with the low pressure compressed air, excellent combustion can be maintained and high combustion efficiency can be assured if the optimum spray form cannot be realized.

Because it is not required to enhance the quality of spray form to inject a large amount of mixture to the sub-combustion chamber 9 from the mixture switching valve 70, the mixture switching valve 70 is not required to greatly enhance the accuracy without relation to the lifting amount of the valve body 81a. Therefore, the cost of the mixture switching valve 70 and valve control system can be reduced.

Figure 10A:
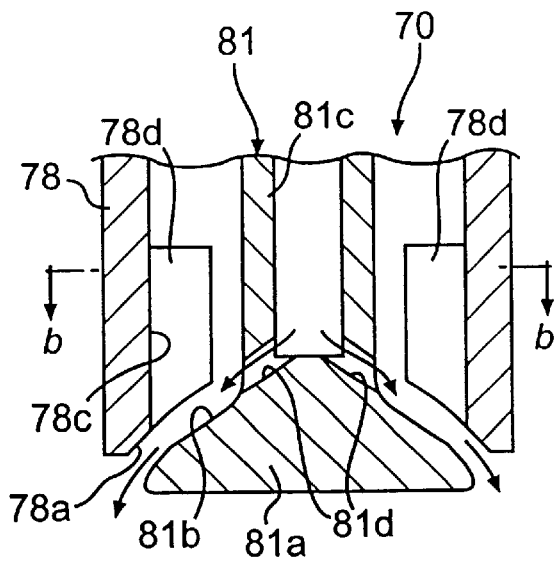
FIGS. 10(a) and 10(b) show a modification around the valve body of the mixture switching valve of the present invention.
Figure 10B:
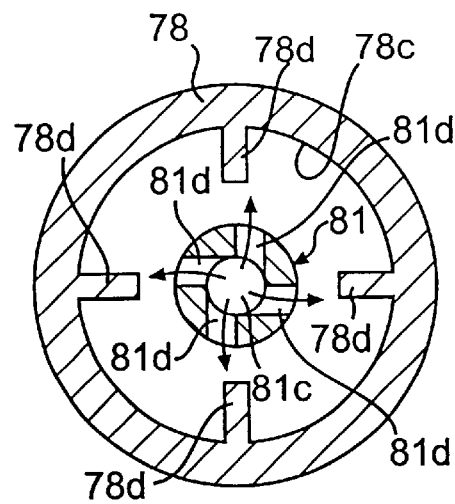

Next, a modification of the part around the valve body 81a will be explained with reference to FIG. 10 and FIG. 11. FIGS. 10(a) and 10(b) show a first modification of the part around the valve body of the mixture switching valve of the present invention. A plurality of baffle plates or fins 78d are formed on the internal wall 78c of the valve seat 78 at the area near the valve seat surface 78a. The mixture in the spiral flow blown out from the blowing holes 81d collides with the baffle plates 78d. Any deposit adhered or to be adhered to the area near the valve with the combustion of the mixture can be blown out with the mixture. Moreover, since the valve body 81a itself is rotated by the spiral flow of the mixture, the upper surface 81b of the valve body 81a collides with the baffle plates 78d and thereby the adhered deposit can be removed.

Figure 11A:
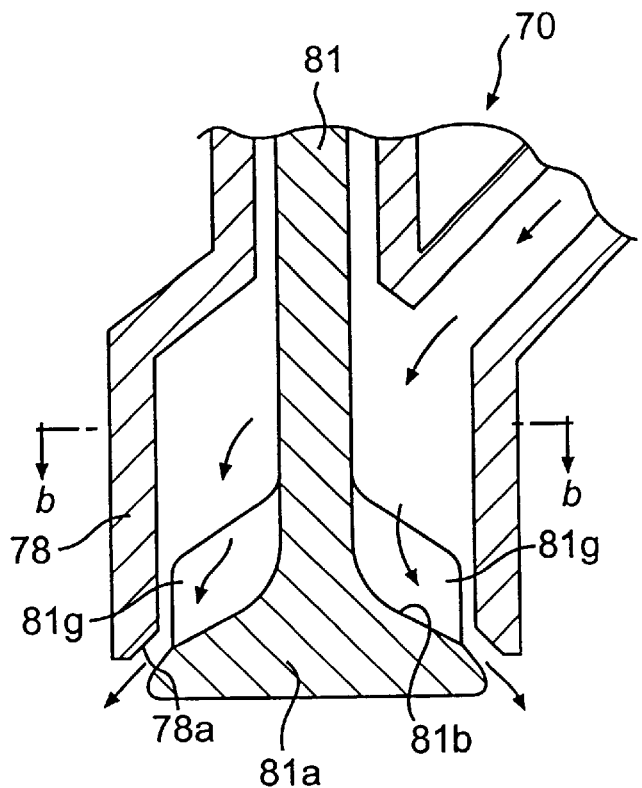
FIGS. 11(a) and 11(b) show a further modification around the valve body of the mixture switching valve of the present invention.
Figure 11B:
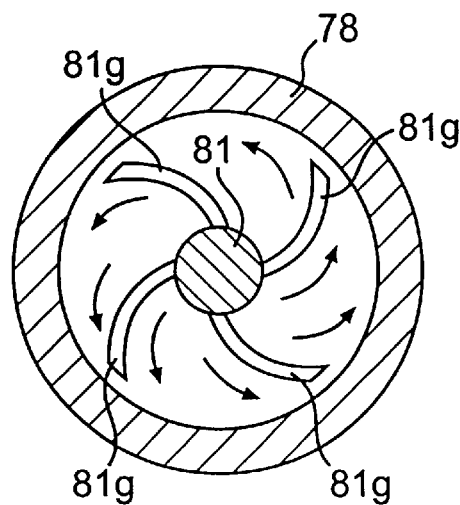

FIGS. 11(a) and 11(b) show a second modification of the area around the valve body of the mixture switching valve of the present invention. The structure of a bottom feeding type mixture switching valve 70 is shown where the mixture is supplied from the intermediate part near the valve body 18a of the valve seat 78. The mixture switching valve 70 of this modification forms a plurality of curved baffle plates or fms 81g on the upper surface 81b of the valve body 81a.

The mixture is changed by the baffle plates 81g to flow in the shape of a spiral flow. Therefore, any deposit adhered or to be adhered to the area near the valve by the combustion effect of the mixture can be blown out with the mixture of the spiral flow.

In above embodiment, the main fuel injecting valve 31 may be connected to the primary side of the air pump 25 to supply the mixture of fuel from the main fuel injecting valve 31 and compressed air to the pressure accumulating chamber 21. In this case, it is no longer necessary to provide the main fuel injecting valve 31 to the pressure accumulating chamber 21.

In the above embodiment, since the sub-combustion chamber is formed of a material having a low thermal conductivity, less heat is released to the external side through the wall of the sub-combustion chamber. As a result, the inside of the sub-combustion chamber is kept at a high temperature. Therefore, the sub-combustion chamber maintains a condition heated by the combustion gas. Since the mixture is supplied to the high temperature sub-combustion chamber, the fuel in the mixture can easily be vaporized. Accordingly, since the fuel is quickly vaporized, if a large amount of fuel is injected to the sub-combustion chamber with low pressure compressed air, an excellent combustion condition may be maintained and high combustion efficiency can also be assured even if particle size of the fuel is large and spray form is not optimum. Moreover, since ignition is possible even when the particle size of the fuel is large, an amount of lift of the valve body of the mixture switching valve can be set to a comparatively large amount.

Since it is not necessary to enhance the quality of the spray form to inject a large amount of mixture into the sub-combustion chamber from the mixture switching valve, it is no longer necessary for the mixture switching valve to greatly enhance the accuracy without relation to the amount of lift of the valve body. Therefore, the cost of the mixture switching valve and valve control system can be reduced.

Moreover, since the spray form of the fuel can be supported by the low pressure compressed air, a low pressure air pump or fuel pump may be used. In the case of extracting the power of the air pump and fuel pump from the internal combustion engine, since each pump is operated at a low pressure, only a small power can be extracted and a large load is not applied to the internal combustion engine.

The sub-combustion made of cast iron has a thermal conductivity which is lower than that of the main combustion chamber made of aluminum alloy, and therefore easily accumulates the heat. Moreover, since the main combustion chamber is formed of an aluminum alloy, the internal combustion engine is lightweight. Therefore, since the fuel is quickly vaporized, even when a large amount of fuel is injected into the sub-combustion chamber with a low pressure compressed air, the fuel is quickly vaporized. Although the internal combustion engine is lightweight, excellent combustion condition can be assured, and high combustion efficiency can be realized even if the spray form is not an optimum one.

Another preferred embodiment of the present invention will be described with reference to FIGS. 12 to 15. A spark ignition two-cycle internal combustion engine 101 having a sub-combustion chamber integrally assembled into a swing power unit 0 for a scooter type motorcycle (not shown) together with a V-belt continuously variable transmission 102. A cylinder head 104 is integrally connected to the upper part of a cylinder block 103 of the spark ignition two-cycle internal combustion engine 101. A left crankcase 105 and right crankcase 106 are divided into right and left sections and are integrally connected to the lower part of the cylinder block 103.

The left crankcase 105 is extended in a rearward direction, and a transmission case 107 is removably connected at the left outer side of the left crankcase.

Together, the transmission case 107 and the left crankcase 105 form a case for the V-belt continuously variable transmission 102. A rear wheel 109 is integrally fixed to a wheel shaft 108 acting as an output shaft of the V-belt continuously variable transmission 102. A crankshaft 110 is rotatably supported by the left crankcase 105 and the right crankcase 106. Power from the crankshaft is transmitted to the rear wheel 109 through the V-belt continuously variable transmission 102.

Figure 14:
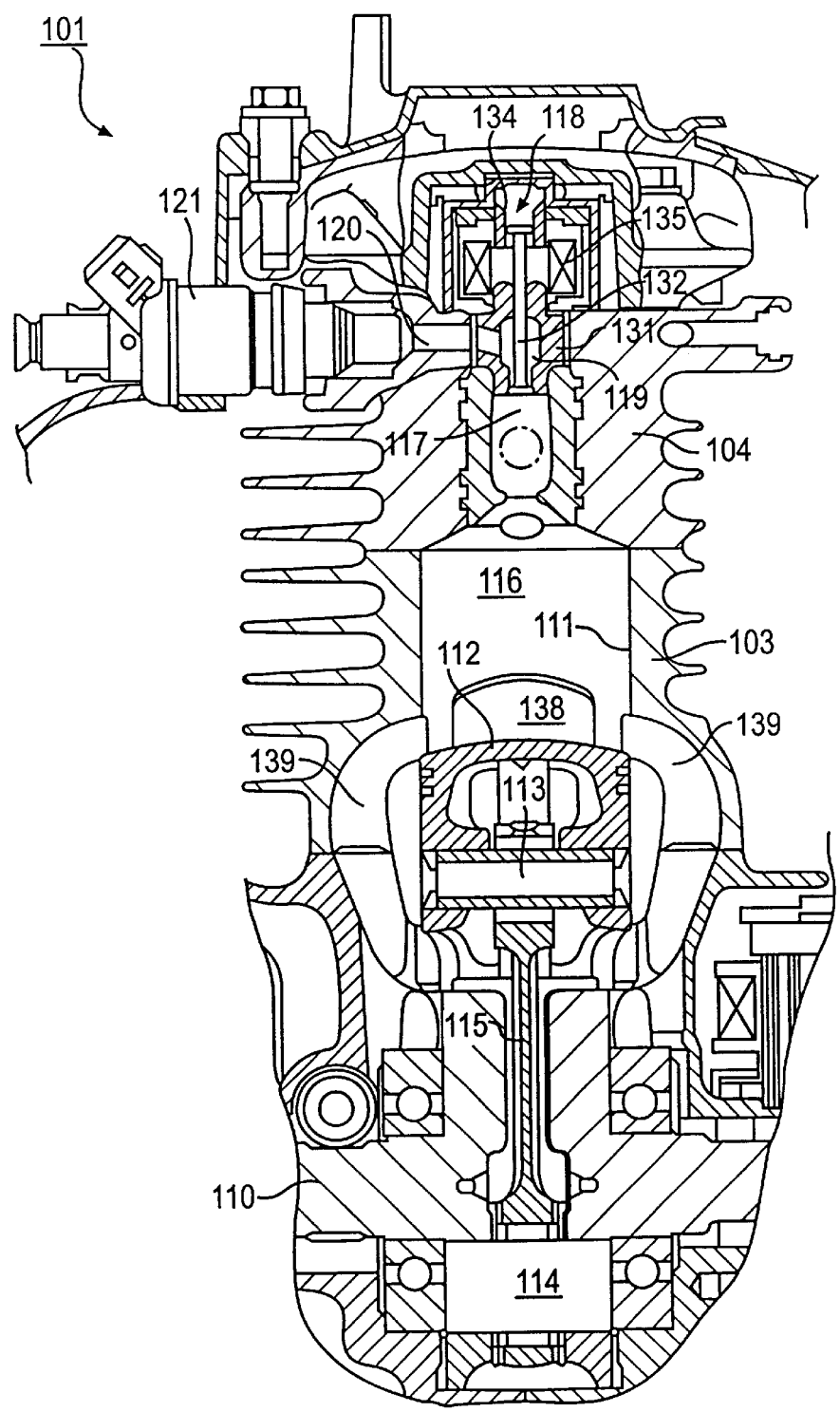
FIG. 14 is a rear view in longitudinal section taken along line 14—14 of FIG. 13.

As shown in FIG. 14, a piston 112 is slidably fitted into a cylinder bore 111 of the cylinder block 103 in the spark ignition type two-cycle internal combustion engine 101. Both ends of a connecting rod 115 are rotatably pivoted to a piston pin 113 of the piston 112 and a crank pin 114 of the crankshaft 110. The crankshaft 110 is rotatably driven as the piston 112 ascends or descends within the cylinder bore 111.

Figure 15:
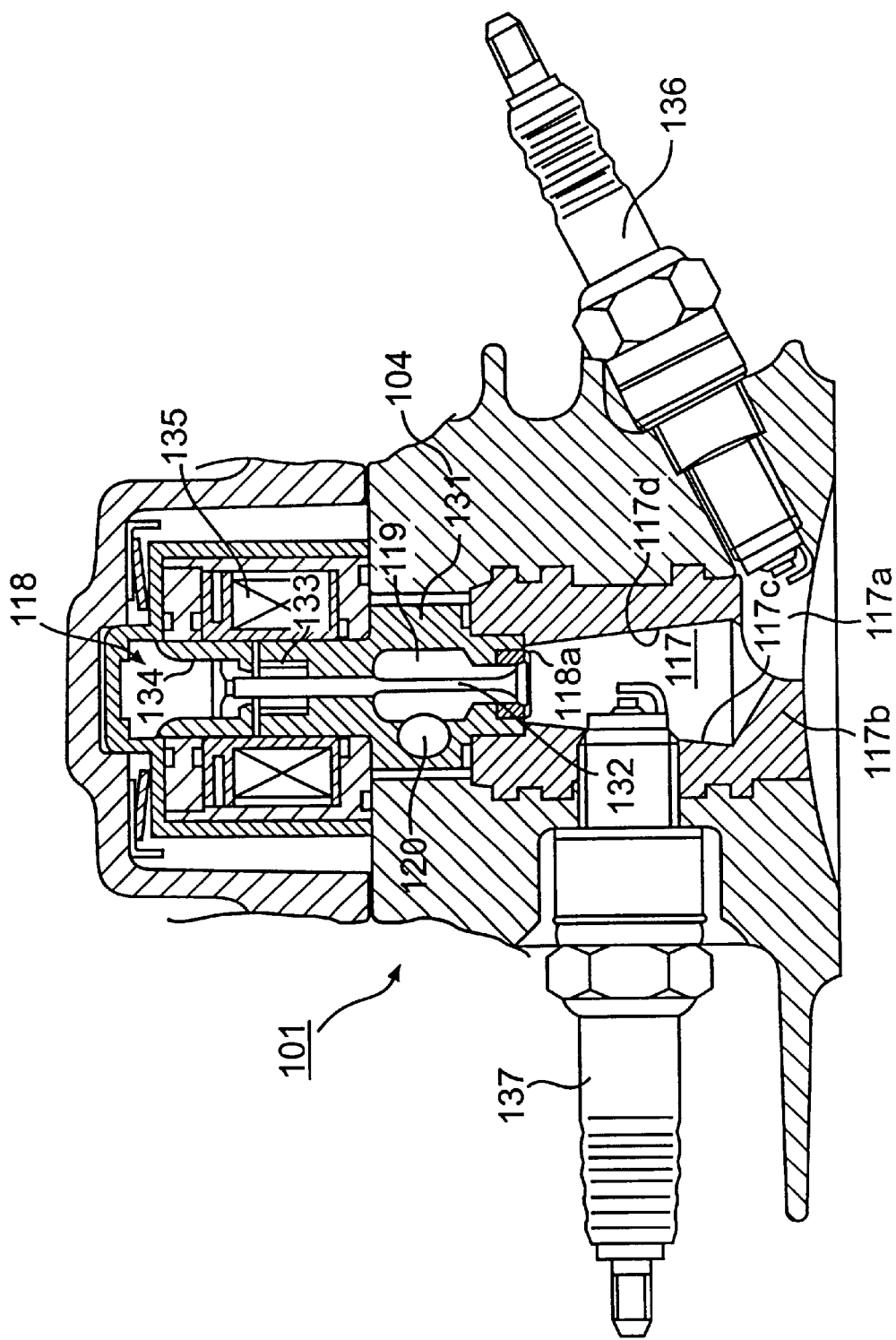
FIG. 15 is a side elevational view in longitudinal section taken along line 15—15 of FIG. 13.

A sub-combustion chamber 117 is located adjacent to a main combustion chamber 116 at the upper part of the cylinder bore 111. The sub-combustion chamber 117 communicates with the main combustion chamber 116, as shown in FIG. 15, and is formed to be gradually diverged as it approaches the main combustion chamber 116. A communicating opening 117a eccentrically displaced with respect to a center line of the sub-combustion chamber 117 toward a right side as viewed in FIG. 15 so as to be communicated with the main combustion chamber 116. A spark plug 136 is installed at the communicating opening 117a, and a spark plug 137 is arranged at a side opposite to the spark plug 136 at the upstream side in the sub-combustion chamber 117. The spark plugs may be arranged in such a way that the spark plug 137 is directed against the spark plug 136 at a right angle as viewed in FIG. 13.

A striking wall 117b is formed on an extended line of a center line of the sub-combustion chamber 117. The gas mixture injected from the gas mixture injecting solenoid valve 118 strikes against the striking wall 117b so as to change its direction toward the spark plug 136.

The gas mixture injecting solenoid valve 118 is arranged at the top end of the sub-combustion chamber 117. A pressure air passage 120 is fixed to be directed toward the center of the pressure accumulating chamber 119 of the gas mixture injecting solenoid valve 118.

Figure 12:
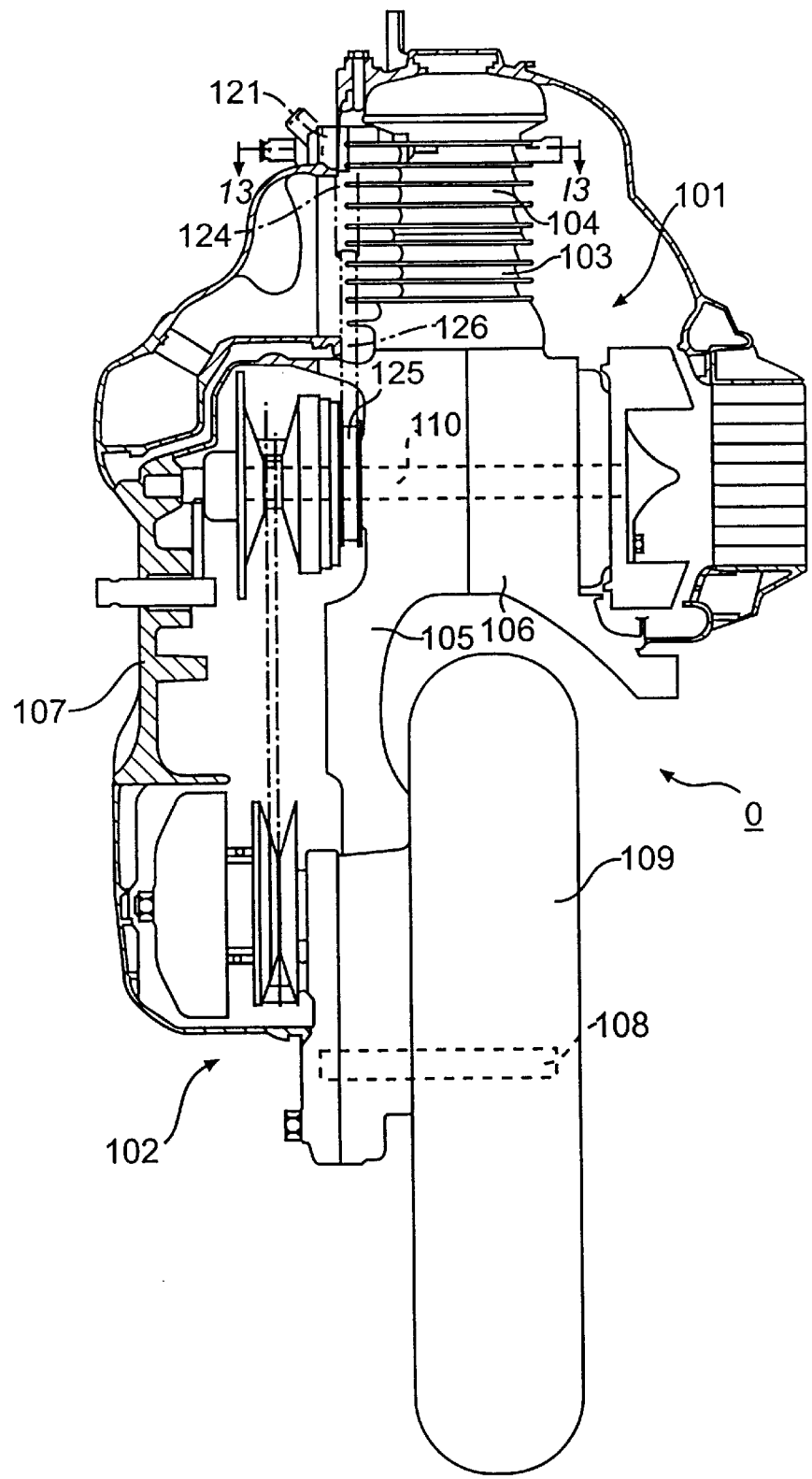
FIG. 12 is a schematic top plan view showing a preferred embodiment of a spark ignition two-cycle internal combustion engine having a sub-combustion chamber of the present invention.
Figure 13:
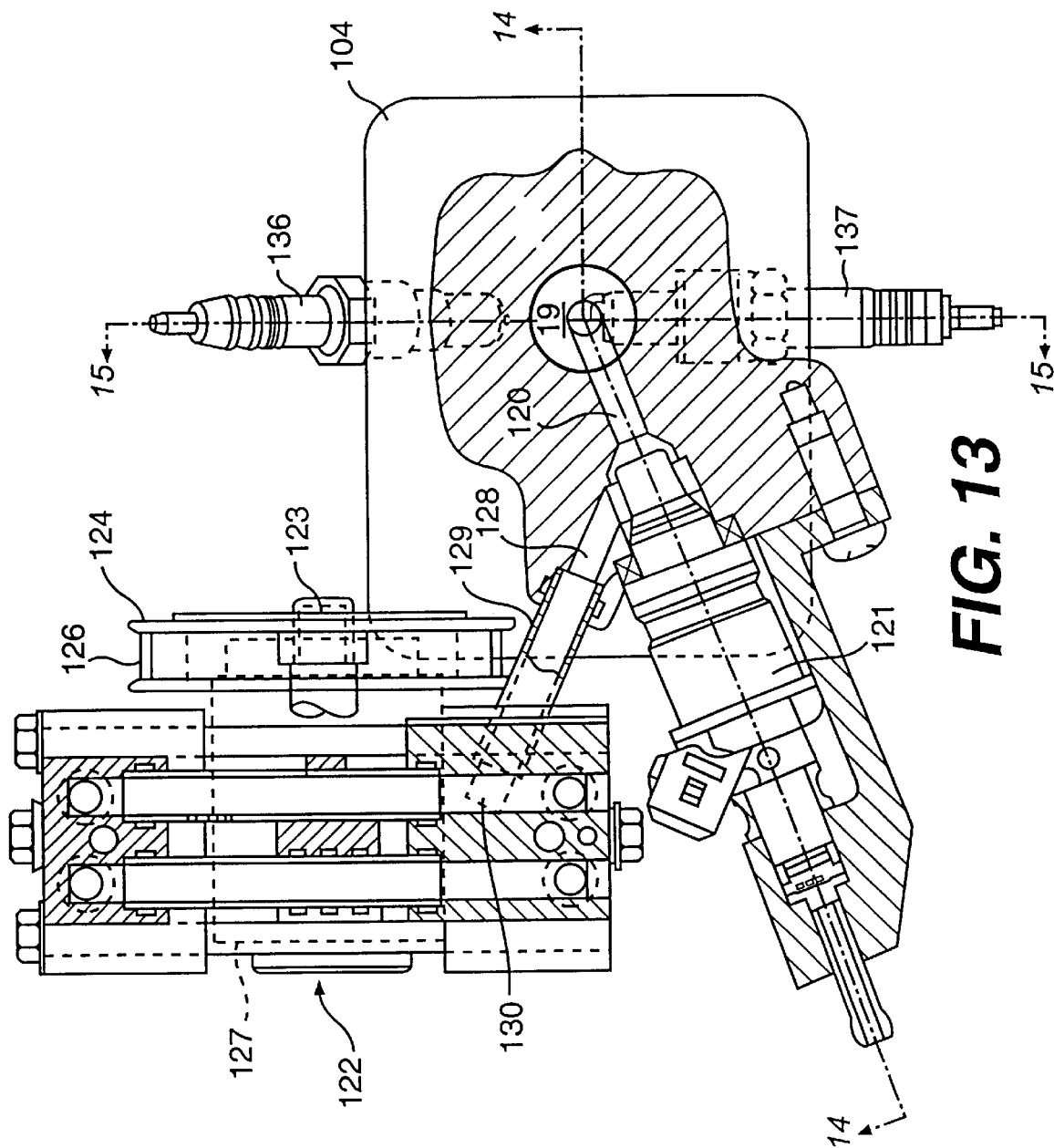
FIG. 13 is a cross-sectional view taken along line 13—13 of FIG. 12.

As shown in FIG. 13, a reciprocating air pump 122 is fixed to the cylinder head 104. A driven pulley 124 is fitted to a right end of a crankshaft 123 of the reciprocating air pump 122. As shown in FIG. 12, a drive pulley 125 is fitted to the crankshaft 110 of the engine 101. A belt 126 is applied over the driven pulley 124 and the drive pulley 125. As the crankshaft 110 is rotated, the crankshaft 123 of the reciprocating air pump 122 is rotationally driven. A piston (not shown) within the cylinder 127 of the reciprocating air pump 122 is reciprocatingly driven through rotation of the crankshaft 123.

As shown in FIG. 13, the cylinder head 104 is formed with a pressure air passage 128 in a direction crossing at a right angle with the extreme end of a fuel injecting valve 121. One end of a communicating pipe 129 is fitted to the pressure air passage 128 along an extended line of the pressure air passage 128. The other end of the communicating pipe 129 is communicated with a discharging chamber 130 of the reciprocating air pump 122. The pressure air compressed by the reciprocating air pump 122 is supplied from the discharging chamber 130 to the pressure accumulating chamber 119 through the communicating pipe 129, the pressure air passage 128 and the pressure air passage 120. The direct injecting solenoid valve 118 is released and when the fuel injecting valve 121 is operated, fuel is injected from the fuel injecting valve 121 to pressure air flow flowing at the pressure air passage 120 at a high speed toward the pressure accumulating chamber 119. The air and fuel are mixed there, and the gas mixture in the pressure accumulating chamber 119 is forced to flow into the sub-combustion chamber 117 from the releasing part 118a of the direct injecting solenoid valve 118.

The direct injecting solenoid valve 118 is comprised of a valve casing 131, a poppet valve member 132 slidably fitted to the valve casing 131 and capable of opening or closing an opening 118a of the direct injecting solenoid valve 118, a coil spring 133 for biasing the poppet valve member 132 in a direction in which the opening 118a of the direct injecting solenoid valve 118 is closed, a magnetic suction member 134 fitted at one end to a top end of the poppet valve member 132, and a solenoid coil 135 sucking the suction member 134 in a downward direction during its operation to cause the direct injecting solenoid valve 118 to be released. When the solenoid coil 135 is electrically energized to be operated, the direct injecting solenoid valve 118 being kept closed up to now is released.

Figure 16:
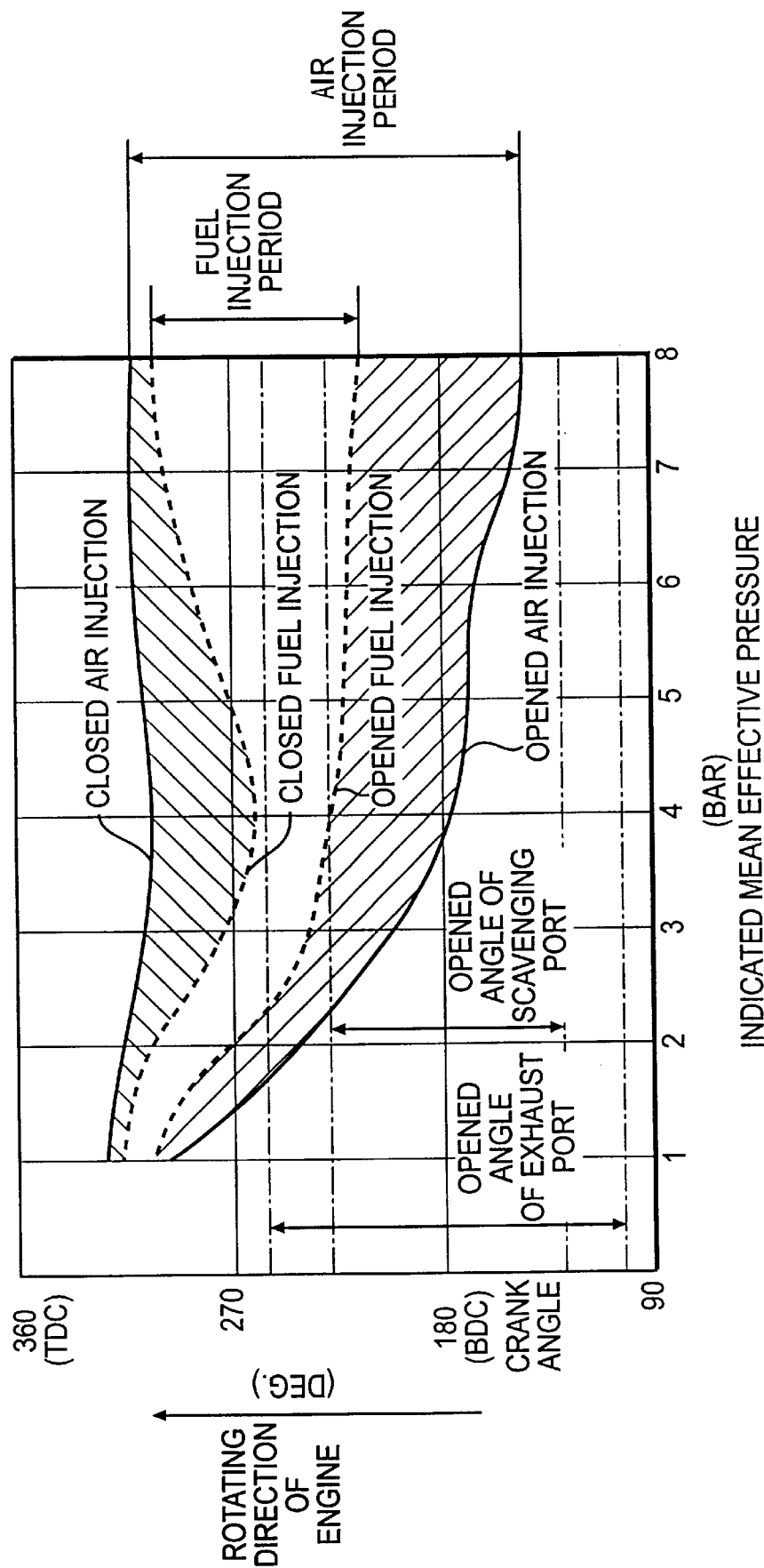
FIG. 16 is a characteristic view showing a pressurized air and a fuel injection timing in the preferred embodiment shown in FIG. 12 in response to a variation of an indicated mean effective pressure.

The gas mixture injecting solenoid valve 118 is opened or closed by a control signal produced from an electronic control device at a crank angle timing as shown in FIG. 16 by a solid line in correspondence with an indicated mean effective pressure PMI=K*W/Ne*Vst, where W is output, Ne is the rate of rotation of the engine, Vst is an exhaust amount of the engine, and K is a proportional constant which is one of operation varying amount of the engine 101. The fuel injecting valve 121 performs a starting of injection and a finishing of injection at a crank angle timing shown in FIG. 16 by a dotted line with the control signal fed from the electronic control device.

The spark plugs 136, 137 are also operated by an electronic control device at a desired iming in correspondence with the indicated mean effective pressure PMI, and a spark is generated concurrently or in an out-of-timing manner.

Figure 17:
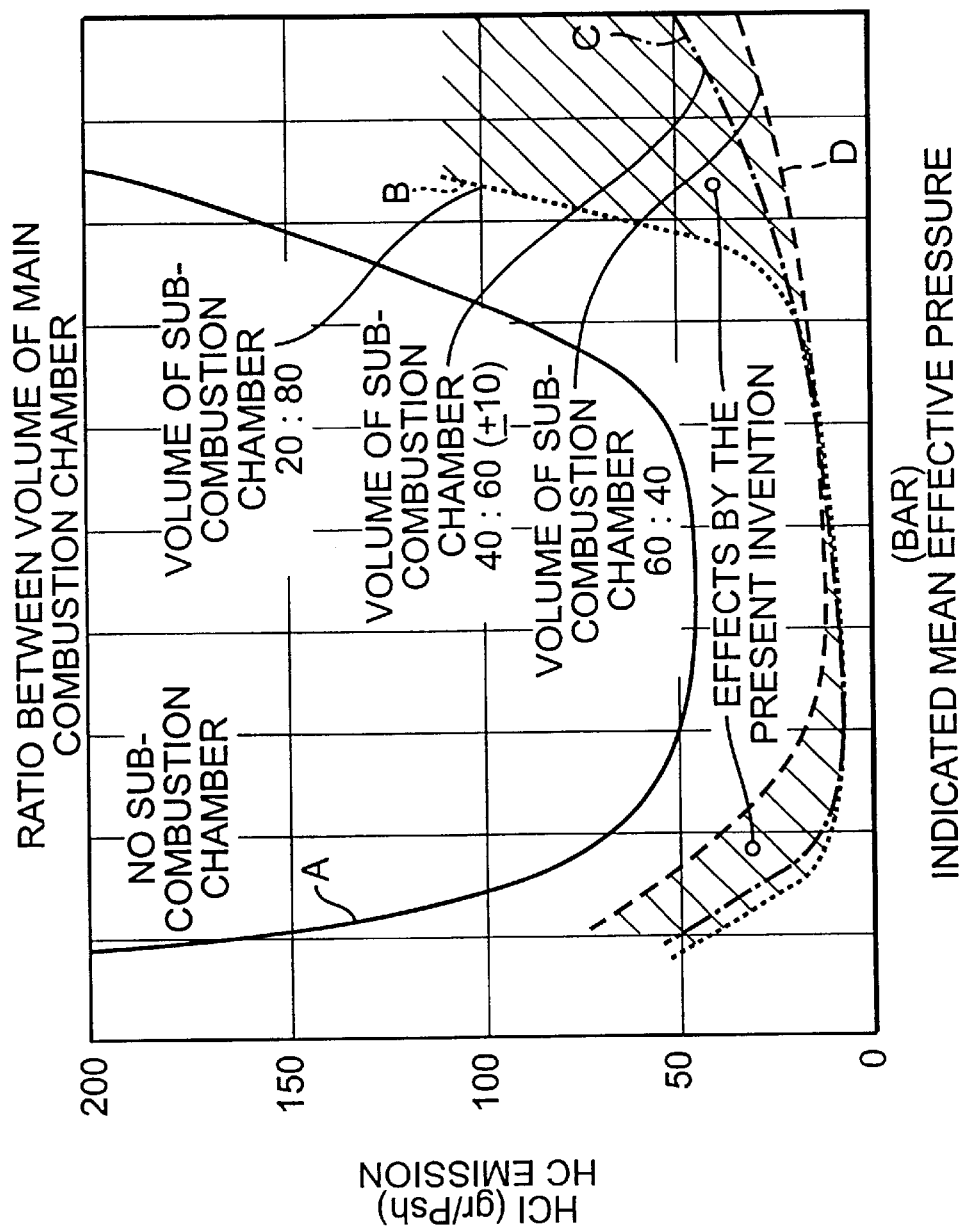
FIG. 17 is a characteristic view showing a hydrogen carbide discharging amount in the preferred embodiment shown in FIG. 12 compared with a hydrogen carbide discharging amount in the prior art internal combustion engine in reference to a variation of an indicated mean effective pressure.
Figure 18:
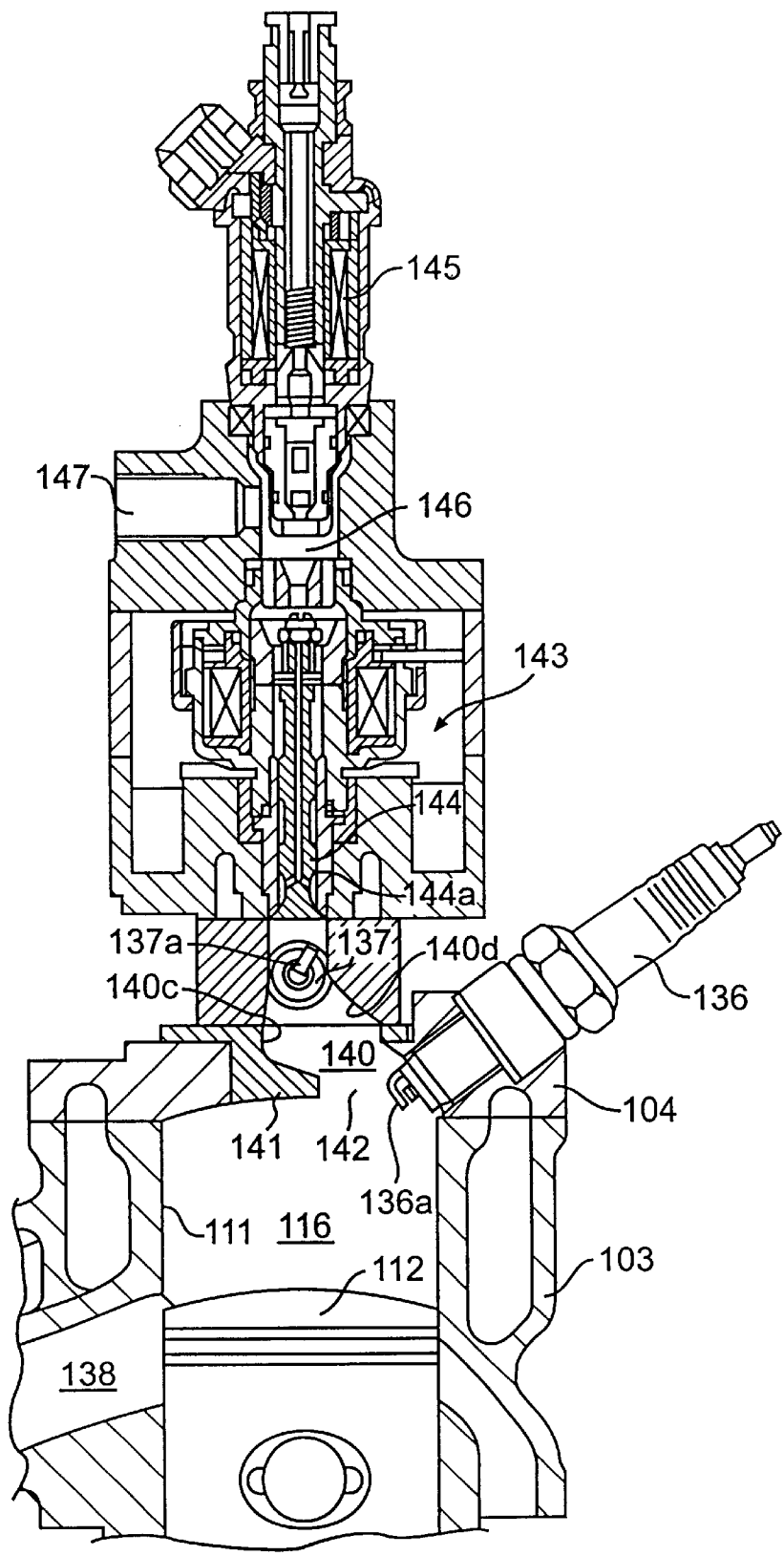
FIG. 18 is a side elevational view in longitudinal section showing another preferred embodiment of the present invention.
Figure 19:
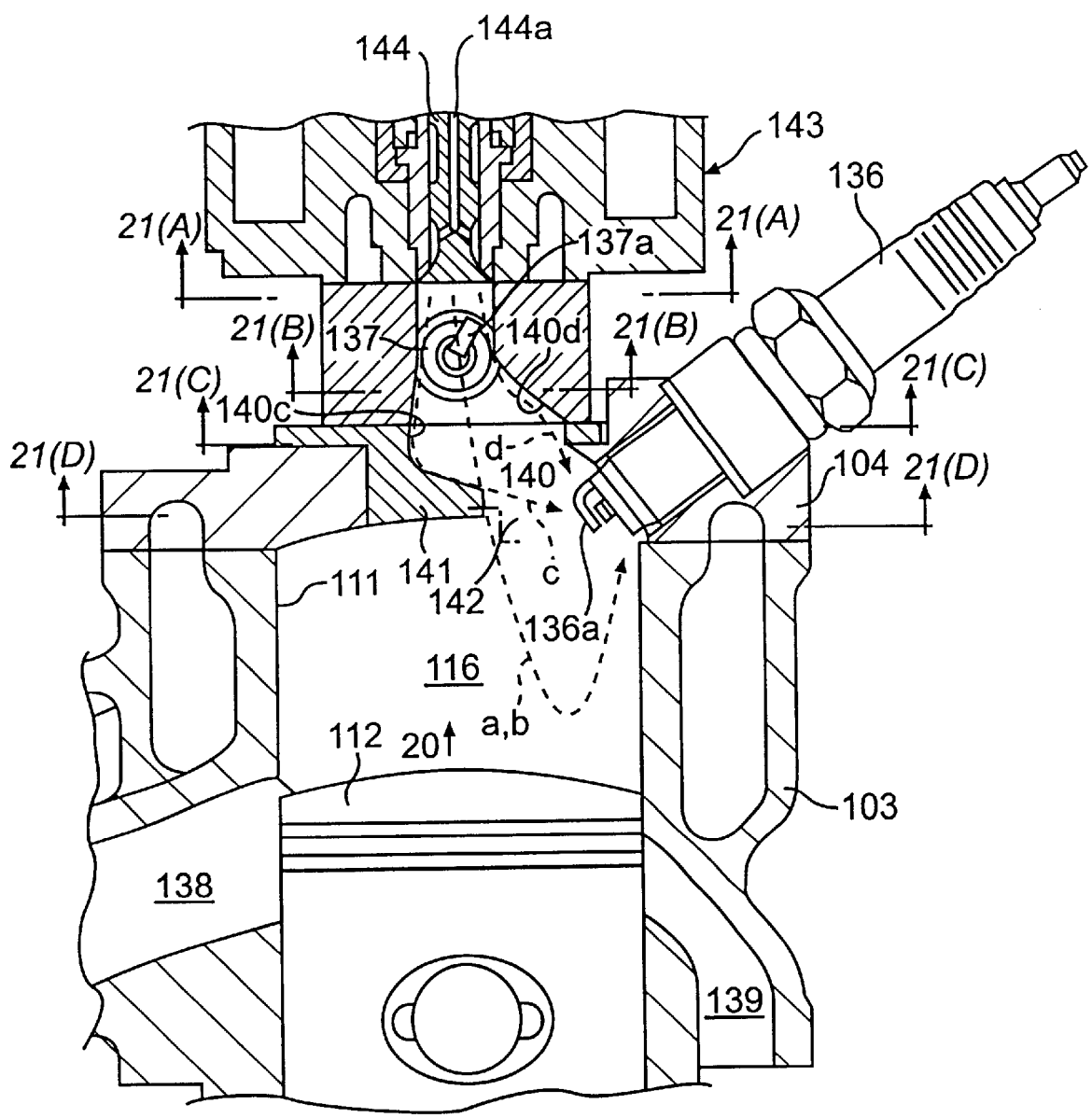
FIG. 19 is an enlarged side elevational view in longitudinal section showing a substantial part shown in FIG. 18.
Figure 20:
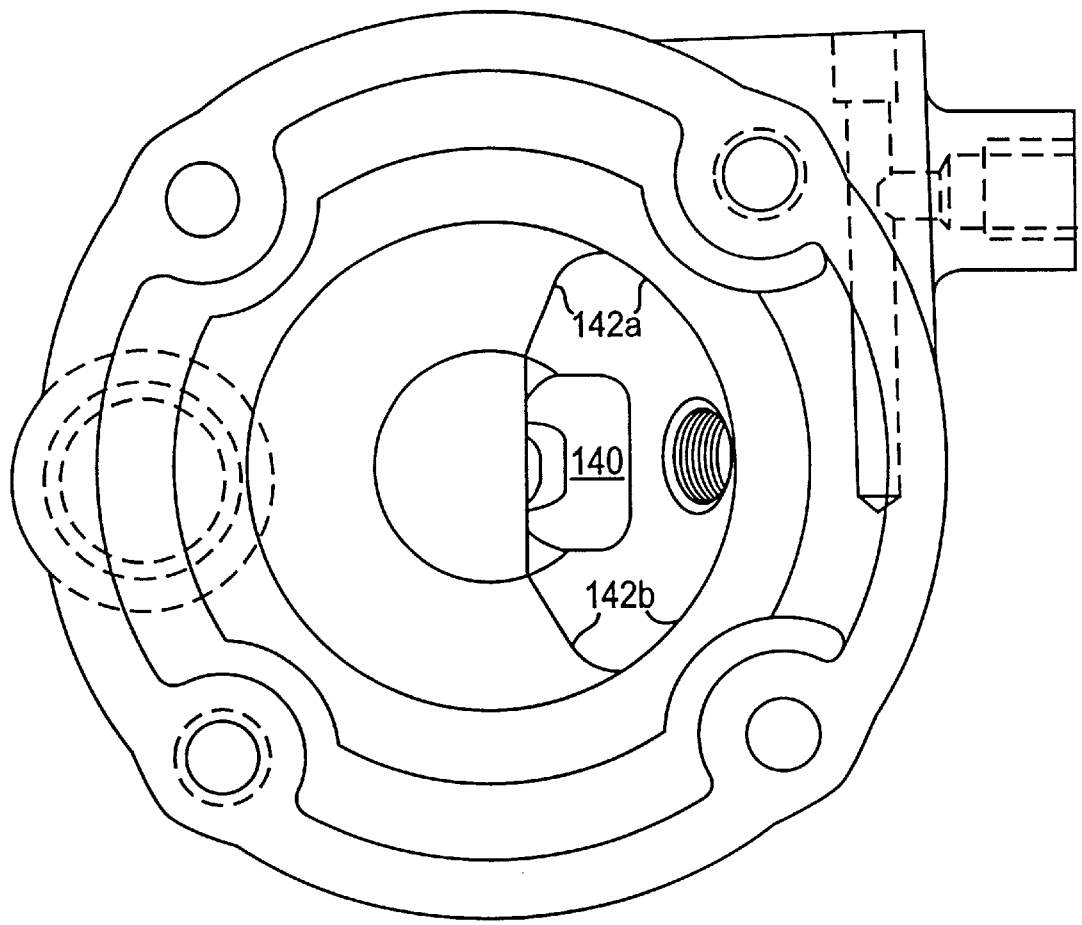
FIG. 20 is a view as seen at an arrow 20 in FIG. 19.
Figure 21A:
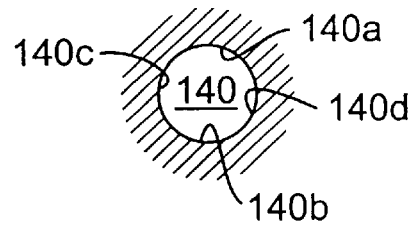
FIGS. 21(A)–21(D) are sectional views taken along each of lines 21(A)–21(A), 21(B)–21(B), 21(C)–21(C) and 21(D)–21(D) in FIG. 19, respectively.
Figure 21B:
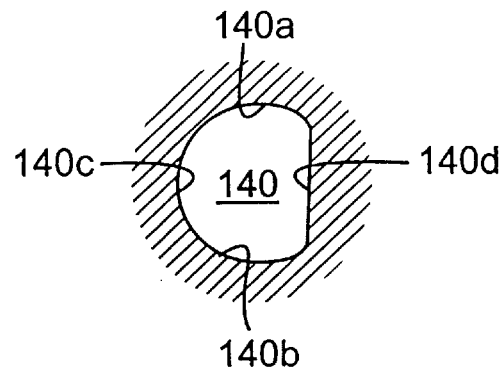
Figure 21C:
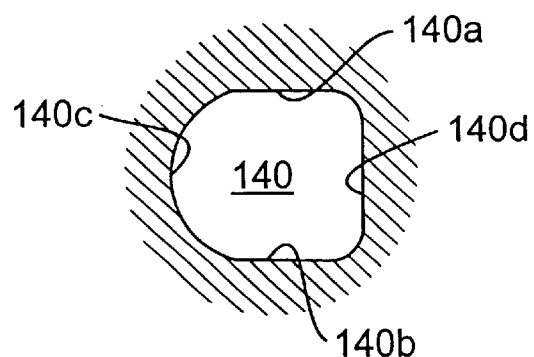
Figure 21D:
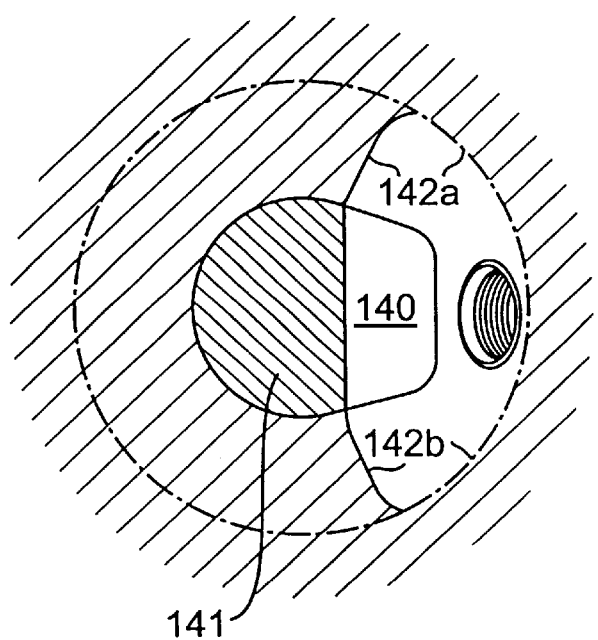
Figure 22:
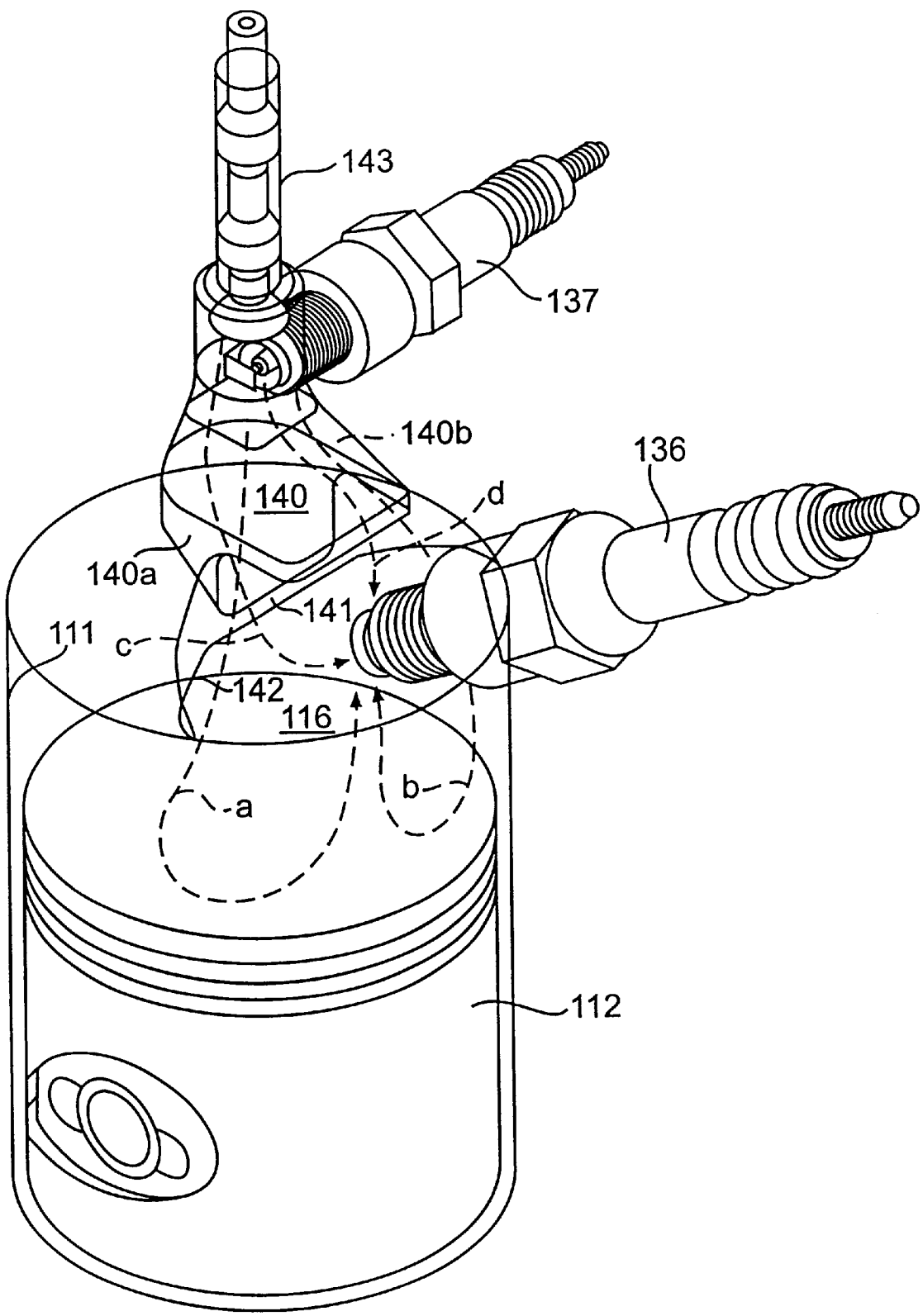
FIG. 22 is a perspective view showing a substantial part shown in FIG. 19.

A discharging characteristic of hydrogen carbide is shown in FIG. 17 for the preferred embodiment shown in FIGS. 12 to 15. The discharging characteristic is set between a characteristic C (2:3 ratio) and a characteristic D (3:2 ratio). The result is superior compared with a characteristic A for an internal combustion engine having no sub-combustion chamber, and a characteristic B for a prior art internal combustion engine having a sub-combustion chamber with a ratio of $V_1:V_2$ being 1:4, where $V_1$ is the volume of the sub-combustion chamber and $V_2$ is the volume of the main combustion chamber.

Since the preferred embodiment shown in FIGS. 12 to 15 is constituted as described above, pressurized air in a pressure accumulating chamber 179 is injected in a radial form into the diverging sub-combustion chamber 117 from the opening 118a of the gas mixture injecting solenoid valve 118 when the gas mixture injecting solenoid valve 118 is opened.

Then, after a desired timing, the air becomes a gas mixture together with fuel injected from the fuel injecting valve 121 and is similarly injected in a radial form into the sub-combustion chamber 117.

As a result, a large amount of fuel is not locally adhered to the side wall surfaces 117c, 117d of the sub-combustion chamber 117 so that irregular combustion is prevented and the production of soot is prevented.

The gas mixture injected into the sub-combustion chamber 117 contacts the electrode of the spark plug 137 in the middle part of it. Thereafter, the gas mixture strikes against the striking wall 117b located on an extended line of the center line of the sub-combustion chamber 117 to change its direction toward the spark plug 136, and the gas then contacts the electrode of the spark plug 136. The result is that the gas mixture in the sub-combustion chamber 117 can be positively ignited.

In addition, the gas mixture injected into the sub-combustion chamber 117 is not injected directly into the main combustion chamber 116, but is stopped by the striking wall 117a and stays there, resulting in that the rich gas mixture and the lean gas mixture overlap in a laminated form at a low load operating range, and laminar combustion may easily be carried out.

As shown in FIGS. 13 and 14, an exhaust port 138 is provided at a side opposite to a side where the communicating opening 117a of the sub-combustion chamber 117 is arranged (a right side in FIG. 15). Therefore, the gas mixture flowing from the sub-combustion chamber 117 into the main combustion chamber 116 through the communicating opening 117a cannot directly reach the exhaust port 138, and blowing-off of the gas can be sufficiently avoided.

A scavenging port 139 is arranged at a side opposite to the exhaust port 138, and additional scavenging ports 139 are provided on both right and left sides of the exhaust port. Since a pressure within the pressure accumulating chamber 119 is increased by the reciprocating air pump 122 more than a pressure in the sub-combustion chamber 117, air can be injected vigorously from within the pressure accumulating chamber 119 into the sub-combustion chamber 117.

Referring now to FIGS. 19 to 22, another preferred embodiment of the present invention will be described. In the preferred embodiment shown in FIGS. 19 to 22, a shape of the sub-combustion chamber 140 is formed to be more smoothly in a diverging shape than that of the sub-combustion chamber 117 of the preferred embodiment shown in FIGS. 12 to 15.

Although both side wall surfaces 140a, 140b of the sub-combustion chamber 140 are formed in a symmetrical shape, the front wall surface 140c of the sub-combustion chamber 140 is steeply inclined with respect to a center line of the cylinder bore 111. A striking wall 141 is projected at the lower edge of the outer front wall surface 140c toward the electrode 136a of the rearward spark plug 136. A communicating opening for communicating between the sub-combustion chamber 140 and the main combustion chamber 116 is positioned near the spark plug 136. A practical cross sectional shape of the sub-combustion chamber 140 is formed as shown in FIGS. 21(*a*)–21(*d*). The shape at the upper part of the sub-combustion chamber 140 is conical. The right and left wall surfaces 140a, 140b and the rear wall surface 140d become pyramidal surfaces as they advance downwardly and only the front wall surface 140c keeps its conical surface.

In addition, both right and left sides 142a, 142b of the communicating opening 142 are projected further outwardly from the striking wall 141 as shown in FIGS. 20 and 21a–21d. The communicating opening 142 is formed in a substantially elongated circle. Gas flow in either the pressurized air or gas mixture injected from the mixture gas injecting solenoid valve 143 flows along both side wall surfaces 140a, 140b of the sub-combustion chamber 140 along broken lines (a) and (b) of FIG. 22. The gas flow along the front wall surface 140c of the sub-combustion chamber 140 flows along a broken line (c), and the gas flow along the rear wall surface 140d of the sub-combustion chamber 140 flows along the broken line (d).

The mixture gas injecting solenoid valve 143 has a structure which is basically similar to that of the gas mixture injecting solenoid valve 118. The gas mixture injecting solenoid valve 118 is arranged along a center line of the cylinder bore 111 above the sub-combustion chamber 140. The extreme end of the pressure air passage 147 is opened at the pressure accumulating chamber 146 which communicates the gas mixture injecting solenoid valve 143 with the fuel injecting valve 145. The base end of the pressure air passage 147 is connected to a pressurizing air pump through a connecting pipe and a surge tank. Pressurized air of constant pressure is always present within the pressure accumulating chamber 146. The fuel injecting valve 145 is operated during a released state of the gas mixture injecting solenoid valve 143 so as to inject fuel.

The spark plug 136 is arranged at the rear wall surface 140d of the sub-combustion chamber 140, and the spark plug 137 is arranged at the right side wall surface 140b of the sub-combustion chamber 140.

The ratio $V_1:V_2$ in the preferred embodiment shown in FIGS. 18 to 22 has a characteristic near a discharging characteristic C (or D) of hydrogen carbide in FIG. 17, as compared with the ratio $V_1:V_2$ in the preferred embodiment shown in FIGS. 12 to 15.

The preferred embodiment shown in FIGS. 19 to 22 is provided with the striking wall 141 in the same manner as that of the preferred embodiment shown in FIGS. 12 to 15. Under a low load operating state, the gas mixture injected into the sub-combustion chamber 140 is formed into a laminated form with gas mixtures of different concentrations, and stable stratified charge combustion is carried out.

In addition, since the communicating opening 142 is displaced eccentrically from the center line of each of the main combustion chamber 116 and the gas mixture injecting solenoid valve 143 toward the spark plug 136, almost of all the gas mixture injected from the gas mixture injecting solenoid valve 143 flows through (c) and (d), contact with the electrode 136a of the spark plug 136. The gas mixture injected from the gas mixture injecting solenoid valve 143 flows along the right and left wall surfaces 140a, 140b and along the right and left side surfaces of the cylinder bore 111 to a downward side of the main combustion chamber 116. The flow then reverses at the top surface of the piston 112, and ascends to reach the electrode 136a of the spark plug 136. The gas mixture flowing along the right side wall surface 140b contacts the electrode 137a of the spark plug 137, resulting in that ignitable gas mixture near the electrodes 136a, 137a of the spark plugs 136, 137 is present and stable stratified charge combustion becomes possible.

Further, since the communicating opening 142 is formed at right and left sides in an elongated circular shape, the gas mixture flow along the right and left wall surfaces 140a, 140b of the sub-combustion chamber 140 does not strike against the striking wall 141, but reach to the downward part in the main combustion chamber 116 along the right and left side surfaces of the cylinder bore 111, and is reversed at the top surface of the piston 112 to generate eddy flow in a longitudinal direction and to perform a sufficient replacement of gas.

In addition, the gas mixture injected from the gas mixture injecting solenoid valve 143 flows toward the spark plug 136 and does not flow toward the exhaust port 138, resulting in that the blowing-off of the gas is sufficiently avoided.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A spark ignition internal combustion engine comprising:
    a main combustion chamber having a first volume;
    a sub-combustion chamber having a second volume communicated with said main combustion chamber;
    an injecting device for intermittently injecting fuel directly into said sub-combustion chamber; and
    an igniting device arranged in said sub-combustion chamber for igniting said fuel,
        wherein a ratio of said second volume to said first volume is set within a range of greater than 3:7 to 3:2.

2. The spark ignition internal combustion engine according to claim 1, wherein said injecting device is a gas mixture injecting device, said gas mixiure injecting device including a pressure accumulating chamber adjacent to said sub-combustion chamber and in which pressurized air is filled, a valve for communicating said pressure accumulating chamber to said sub-combustion chamber, and a fuel injecting valve for injecting fuel into said pressure accumulating chamber.

3. The spark ignition internal combustion engine according to claim 2, wherein said sub-combustion chamber is arranged on a center line of a cylinder bore of said engine, said injecting device is arranged on said center line of said cylinder bore of said engine, and said main combustion chamber is eccentrically displaced from the center line of said cylinder bore toward a side thereof.

4. The spark ignition internal combustion engine according to claim 3, wherein a center of a communicating opening for communicating said main combustion chamber with the sub-combustion chamber is substantially positioned on a line connecting a center of said main combustion chamber to a center of the sub-combustion chamber, and said communicating opening is directed substantially at a right angle with respect to a center line of said main combustion chamber and sub-combustion chamber.

5. The spark ignition internal combustion engine according to claim 4, wherein said internal combustion engine is a two-cycle internal combustion engine.

6. The spark ignition internal combustion engine according to claim 1, wherein the ratio of said second volume to said first volume is approximately 2:3.

7. The spark ignition internal combustion engine according to claim 1, wherein said sub-combustion chamber is arranged on a center line of a cylinder bore of said engine, said injecting device is arranged on said center line of said cylinder bore of said engine, and said main combustion chamber is eccentrically displaced from the center line of said cylinder bore toward a side thereof.

8. The spark ignition internal combustion engine according to claim 7, wherein a center of a communicating opening for communicating said main combustion chamber with the sub-combustion chamber is substantially positioned on a line connecting a center of said main combustion chamber to a center of the sub-combustion chamber, and said communicating opening is directed substantially at a right angle with respect to a center line of said main combustion chamber and sub-combustion chamber.

9. The spark ignition internal combustion engine according to claim 8, wherein said internal combustion engine is a two-cycle internal combustion engine.

10. The spark ignition internal combustion engine according to claim 9, wherein the ratio of said second volume to said first volume is approximately 2:3.

11. The spark ignition internal combustion engine according to claim 1, wherein a center of a communicating opening for communicating said main combustion chamber with the sub-combustion chamber is substantially positioned on a line connecting a center of said main combustion chamber to a center of the sub-combustion chamber, and said communicating opening is directed substantially at a right angle with respect to a center line of said main combustion chamber and sub-combustion chamber.

12. The spark ignition internal combustion engine according to claim 11, wherein said internal combustion engine is a two-cycle internal combustion engine.

13. The spark ignition internal combustion engine according to claim 12, wherein the ratio of said second volume to said first volume is approximately 2:3.

14. The spark ignition internal combustion engine according to claim 1, wherein said internal combustion engine is a two-cycle internal combustion engine.

15. The spark ignition internal combustion engine according to claim 14, wherein the ratio of said second volume to said first volume is approximately 2:3.

16. The spark ignition internal combustion engine according to claim 1, wherein the ratio of said second volume to said first volume is approximately 2:3.

17. The spark ignition internal combustion engine according to claim 1, wherein the ratio of said second volume to said first volume is set within a range of 2:3 to 3:2.

* * * * *